US010778429B1

(12) United States Patent
Rubin et al.

(10) Patent No.: US 10,778,429 B1
(45) Date of Patent: Sep. 15, 2020

(54) STORAGE OF CRYPTOGRAPHIC INFORMATION

(71) Applicant: Amazon Technologies, Inc., Seattle, WA (US)

(72) Inventors: Gregory Alan Rubin, Seattle, WA (US); Benjamin Philip Grubin, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 14/958,816

(22) Filed: Dec. 3, 2015

(51) Int. Cl.
  *H04L 29/06* (2006.01)
  *G06F 21/78* (2013.01)
  *H04L 9/08* (2006.01)

(52) U.S. Cl.
  CPC ............ H04L 9/0897 (2013.01); G06F 21/78 (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,381,479 A * | 1/1995 | Gardeck | ............... | H04L 9/0822 380/273 |
| 8,065,739 B1 * | 11/2011 | Bruening | ............ | G06F 21/6227 704/2 |
| 9,477,551 B1 * | 10/2016 | Piszczek | ............... | G06F 16/119 |
| 2003/0028493 A1 * | 2/2003 | Tajima | ............... | G06Q 20/3674 705/67 |
| 2004/0003272 A1 * | 1/2004 | Bantz | .................. | G06F 11/1464 713/193 |
| 2004/0049700 A1 * | 3/2004 | Yoshida | .............. | G06F 11/1464 726/26 |
| 2006/0179478 A1 | 8/2006 | Han et al. | | |
| 2007/0136200 A1 * | 6/2007 | Frank | ..................... | G06Q 10/10 705/50 |
| 2008/0069353 A1 | 3/2008 | Lotspiech | | |
| 2010/0083039 A1 * | 4/2010 | Chew | ...................... | G06F 21/80 714/6.12 |

(Continued)

OTHER PUBLICATIONS

D. S. Papailiopoulos, J. Luo, A. G. Dimakis, C. Huang, and J. Li, Simple regenerating codes: Network coding for cloud storage, Proc. IEEE INFOCOM, 2012, pp. 2801-2805. (Year: 2012).*

(Continued)

*Primary Examiner* — Michael R Vaughan
(74) *Attorney, Agent, or Firm* — Davis Wright Tremaine LLP

(57) ABSTRACT

Fault-tolerant storage of cryptographic information maintained on a fleet of HSMs may be provided by dividing the cryptographic information into a number of stripes which are distributed and stored on individual HSMs in the HSM fleet. Parity information is generated which allows one or more stripes to be regenerated if one or more stripes becomes corrupt or is lost. The parity information may be stored on an HSM in the HSM fleet, or outside the fleet on a storage service, HSM management hub, tangible computer-readable media, or other device. If an HSM in the HSM fleet fails, resulting in the loss of a stripe, an HSM in the fleet can recover the missing stripe by re-creating the missing stripe from the remaining stripes combined with the parity information. In some examples, stripes are mirrored within the fleet of HSMs.

21 Claims, 18 Drawing Sheets

(56) References Cited

U.S. PATENT DOCUMENTS

| | | | |
|---|---|---|---|
| 2010/0125736 A1* | 5/2010 | Jang | G06F 21/10 713/171 |
| 2010/0169280 A1 | 7/2010 | Shi et al. | |
| 2011/0161521 A1 | 6/2011 | McDysan et al. | |
| 2011/0176675 A1* | 7/2011 | Hughes | H04L 9/0822 380/44 |
| 2012/0179911 A1* | 7/2012 | Zheng | H04L 9/0894 713/168 |
| 2012/0203990 A1* | 8/2012 | Konig | H04L 9/0894 711/164 |
| 2012/0243685 A1 | 9/2012 | Tanaka et al. | |
| 2012/0281837 A1 | 11/2012 | Arnold et al. | |
| 2012/0321076 A1* | 12/2012 | Shah | H04L 9/0869 380/44 |
| 2013/0159699 A1 | 6/2013 | Torkkel | |
| 2014/0074724 A1 | 3/2014 | Gordon et al. | |
| 2014/0093084 A1 | 4/2014 | De Atley et al. | |
| 2014/0136832 A1* | 5/2014 | Klum | H04L 63/0428 713/150 |
| 2015/0143135 A1* | 5/2015 | Ueda | G06F 21/10 713/193 |
| 2015/0310188 A1 | 10/2015 | Ford et al. | |
| 2015/0326543 A1 | 11/2015 | Pochuev et al. | |
| 2015/0341327 A1 | 11/2015 | Barton et al. | |
| 2015/0358312 A1 | 12/2015 | Kancharla et al. | |
| 2016/0087946 A1* | 3/2016 | Yang | G06F 21/62 713/171 |
| 2016/0132699 A1* | 5/2016 | Miller | G06F 21/80 713/193 |
| 2016/0241393 A1 | 8/2016 | Boenisch et al. | |
| 2016/0261408 A1 | 9/2016 | Peddada et al. | |
| 2016/0323250 A1 | 11/2016 | Winter et al. | |
| 2017/0093802 A1 | 3/2017 | Norum et al. | |
| 2017/0250801 A1* | 8/2017 | Chen | H04L 9/085 |

OTHER PUBLICATIONS

"The World of P2P: BitTorrent Protocols and Software," Wikibooks, last edited Oct. 19, 2013 [retrieved Aug. 7, 2017], https://en.wikibooks.org/wiki/The_World_of_Peer-to-Peer_(P2P)/Networks_and_Protocols/BitTorrent, 12 pages.
Seo et al., "Encryption Key Management for Secure Communication in Smart Advanced Metering Infrastructures," 2013 IEEE International Conference on Smart Grid Communications, date of conference Oct. 21-24, 2013, published online Dec. 19, 2013, pp. 498-503.
Tan et al., "A Secure and Authenticated Key Management Protocol (SA-KMP) for Vehicular Networks," IEEE Transactions on Vehicular Technology 65(12):9570-9584, Dec. 2016.
Hulin, M.K., et al., "Gossip-Style Database Monitoring," U.S. Appl. No. 14/740,218, filed Jun. 15, 2015.
Roth, G.B., et al., "Secure Management of Information Using a Security Module," U.S. Appl. No. 13/765,283, filed Feb. 12, 2013.
"Hardware Security Module," Wikipedia, The Fee Encyclopedia, Oct. 21, 2015, <https://en.wikipedia.org/wiki/Hardward_security_module> [retrieved Dec. 3, 2015], 5 pages.
Michaels, J., "FIPS: What Goes in Never Comes Out!," DevCentral, <https://devcentral.f5.com/articles/fips-what-goes-in-never-comes-out> [retreived Dec. 3, 2015], 8 pages.
"nShield Connect+," Thales eSecurity, Inc., <https:/www.thales-esecurity.com/products-and-services/products-and-services/hardware-s . . . > [retrieved Dec. 3, 2015], 2 pages.
"Overview of Luna High Availability and Load Balancing," SafeNet, Inc., The Data Protection Company, 8 pages.
Peterson, W.W., and E.J. Weldon, Jr., "Error-Correcting Codes," The MIT Press, 2nd ed., 1972, Chapter 13, "Random-Error-Correcting Conventional Codes," pp. 392-425.
Atkinson, R., "Security Architecture for the Internet Protocol," Request for Comments: 1825, Standards Track, Aug. 1995, 23 pages.

Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Adams, C., "The CAST-128 Encryption Algorithm," Request for Comments: 2144, Informational, May 1997, 15 pages.
Dierks, T., et al., "The TLS Protocol Version 1.0," Request for Comments: 2246, Standards Track, Jan. 1999, 75 pages.
Kent, S., "Security Architecture for the Internet Protocol," Request for Comments: 2401, Standards Track, Nov. 1998, 62 pages.
Orman, H., "The OAKLEY Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 16 pages.
Adams, C., and J. Gilchrist, "The CAST-256 Encryption Algorithm," Request for Comments: 2612, Informational, Jun. 1999, 18 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Adams, C., "Use of the CAST-128 Encryption Algorithm in CMS," Request for Comments: 2984, Standards Track, Oct. 2000, 6 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Lehtinen, S., and C. Lonvick, "The Secure Shell (SSH) Protocol Assigned Numbers," Request for Comments: 4250, Standards Track, Jan. 2006, 19 pages.
Ylonen, T., and C. Lonvick, "The Secure Shell (SSH) Protocol Architecture," Request for Comments: 4251, Standards Track, Jan. 2006, 28 pages.
Ylonen, T., and C. Lonvick, "The Secure Shell (SSH) Authentication Protocol," Request for Comments: 4252, Standards Track, Jan. 2006, 16 pages.
Ylonen, T., and C. Lonvick, "The Secure Shell (SSH) Transport Layer Protocol," Request for Comments: 4253, Standards Track, Jan. 2006, 30 pages.
Ylonen, T., and C. Lonvick, "The Secure Shell (SSH) Connection Protocol," Request for Comments: 4254, Standards Track, Jan. 2006, 23 pages.
Schlyter, J., and W. Griffin, "Using DNS to Securely Publish Secure Shell (SSH) Key Fingerprints," Request for Comments: 4255, Standards Track, Jan. 2006, 9 pages.

(56) References Cited

OTHER PUBLICATIONS

Cusack, F., and M. Forssen, "Generic Message Exchange Authentication for the Secure Shell Protocol (SSH)," Request for Comments: 4256, Standards Track, Jan. 2006, 12 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Galbraith, J., and P. Remaker, "The Secure Shell (SSH) Session Channel Break Extension," Request for Comments: 4335, Standards Track, Jan. 2006, 6 pages.
Bellare, M., et al., "The Secure Shell (SSH) Transport Layer Encryption Modes," Request for Comments: 4344, Standards Track, Jan. 2006, 12 pages.
Harris, B., "Improved Arcfour Modes for the Secure Shell (SSH) Transport Layer Protocol," Request for Comments: 4345, Standards Track, Jan. 2006, 5 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Friedl, M., et al., "Diffie-Hellman Group Exchange for the Secure Shell (SSH) Transport Layer Protocol," Request for Comments: 4419, Standards Track, Mar. 2006, 10 pages.
Harris, B., "RSA Key Exchange for the Secure Shell (SSH) Transport Layer Protocol," Request for Comments: 4432, Standards Track, Mar. 2006, 8 pages.
Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Galbraith, J. and R. Thayer, "The Secure Shell (SSH) Public Key File Format," Request for Comments: 4716, Nov. 2006, 11 pages.
Blumenthal, U., and P. Goel, "Pre-Shared Key (PSK) Ciphersuites with Null Encryption for Transport Layer Security (TLS)," Request for Comments: 4785, Standards Track, Jan. 2007, 6 pages.
Galbraith, J., et al., "Secure Shell Public Key Subsystem," Request for Comments: 4819, Standards Track, Mar. 2007, 18 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.

Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Igoe, K., and J. Solinas, "AES Galois Counter Mode for the Secure Shell Transport Layer Protocol," Request for Comments: 5647, Informational, Aug. 2009, 10 pages.
Stebiula, D., and J. Green, "Elliptic Curve Algorithm Integration in the Secure Shell Transport Layer," Request for Comments: 5656, Standards Track, Dec. 2009, 19 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, E., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Igoe, K., and D. Stebila, "X.509v3 Certificates for Secure Shell Authentication," Request for Comments: 6187, Standards Track, Mar. 2011, 17 pages.
Kim, W., et al., "Addition of the ARIA Cipher Suites to Transport Layer Security (TLS)," Request for Comments: 6209, Informational, Apr. 2011, 10 pages.
Igoe, K., "Suite B Cryptographic Suites for Secure Shell (SSH)," Request for Comments: 6239, Informational, May 2011, 15 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.
McGrew, D., and D. Bailey, "AES-CCM Cipher Suites for Transport Layer Security (TLS)," Request for Comments: 6655, Standards Track, Jul. 2012, 8 pages.
Bider, D., and M. Baushke, "SHA-2 Data Integrity Verification for the Secure Shell (SSH) Transport Layer Protocol," Request for Comments: 6668, Standards Track, Jul. 2012, 6 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.

(56) References Cited

OTHER PUBLICATIONS

Wang et al., "Group Key Management Scheme Based on Proxy Re-cryptography for Near-Space Network," International Conference on Network Computing and Information Security, May 14, 2011, 5 pages.

\* cited by examiner

STORAGE OF CRYPTOGRAPHIC INFORMATION

CROSS-REFERENCE TO RELATED APPLICATION

This application incorporates by reference for all purposes the full disclosure of co-pending U.S. patent application Ser. No. 14/958,808, filed Dec. 3, 2015, entitled "CRYPTOGRAPHIC KEY DISTRIBUTION."

BACKGROUND

Maintaining the security of computer systems is a difficult problem. One way that computer systems are secured, is through the use of cryptography. Cryptographic systems rely on one or more cryptographic keys to protect information. In many situations the security of the cryptographic keys is paramount, because access to the cryptographic keys allows access to the data that is being protected. One way cryptographic keys can be secured is through the use of a Hardware Security Module ("HSM"). An HSM is a physical computing device that safeguards cryptographic keys by storing them within a tamper-resistant physical device. HSMs provide cryptographic key generation and storage, and perform cryptographic operations for authorized clients of the HSM. Some cryptographic keys, called session keys, are associated with a particular connection from a particular HSM client, and are deleted as a result of termination of the session. Token keys are cryptographic keys that persist on the HSM, and that can be used by multiple users and sessions. In general, the cryptographic keys are not exportable from the HSM in an unprotected form.

In large-scale computing environments, the demand for cryptographic operations may exceed the capabilities of a single HSM. To improve the performance of cryptographic operations, some HSMs provide acceleration of cryptographic operations. In distributed computing environments, multiple HSMs may be used to provide cryptographic functions to various servers and clients throughout the distributed environment. Maintaining a fleet of HSMs can be difficult, because the non-exportability of the cryptographic keys makes it difficult to maintain a collection of synchronized cryptographic keys across the fleet.

BRIEF DESCRIPTION OF THE DRAWINGS

Various techniques will be described with reference to the drawings, in which.

DETAILED DESCRIPTION

Figure 1:
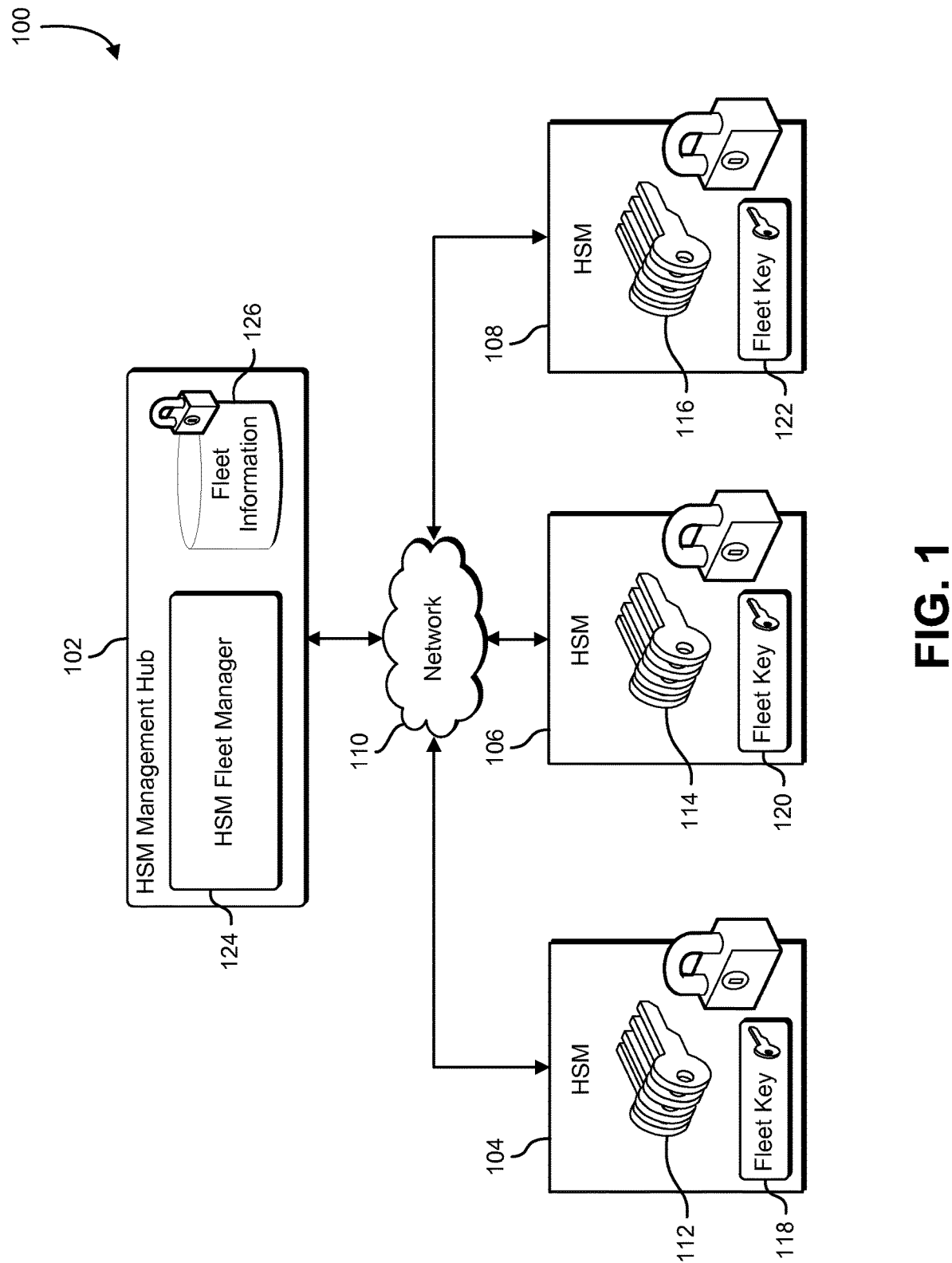
FIG. 1 shows an illustrative example of an environment in which various embodiments may be practiced.

The current document describes systems and methods that distribute and synchronize cryptographic information across a fleet of HSMs. A number of HSMs are organized into a fleet that is managed by an HSM management hub. Each HSM in the fleet is provided with a copy of a domain key for the fleet called a fleet key. A fleet management agent is installed on each HSM that communicates with the HSM management hub and facilitates operations which are coordinated by the HSM management hub. The HSM management hub communicates with the members of the fleet, and facilitates the exchange and synchronization of cryptographic information between the HSMs. The HSM management hub is able to facilitate the formation of HSM domains, distribute updated cryptographic information, and backup and restore HSM data.

The fleet can include various types of HSMs such as internal HSMs, directly attached HSMs, and network HSMs. An internal HSM is an HSM that is contained within a host computer system such as a PC, laptop, or tablet computer. Internal HSMs may take the form of an expansion card such as a PCI card, PCMCIA card, or an SD card that is installed in the host computer system. A directly attached HSM is an HSM peripheral that has a direct physical connection to a host computer. Examples of directly attached HSMs include HSMs that are connected to the host computer with a USB connection, a serial connection, or a FireWire connection. A network HSM is an HSM that is connected to a computer network. Clients of a network HSM connect to the network HSM over the computer network, and in some examples, multiple clients are able to access a single HSM.

The HSM management hub is a computing appliance that operates an HSM fleet manager service and maintains a database of fleet information. The HSM fleet manager service includes a configuration manager and a fleet data manager. The configuration manager manages the structure of the HSM fleet by recording information such as fleet membership, domain membership, and HSM hierarchies. The fleet data manager manages information stored on the fleet of HSMs by propagating and synchronizing cryptographic information across the fleet of HSMs in accordance with the structure of the fleet. In general, the cryptographic information propagated by the HSM management hub is protected by cryptographic keys maintained on the HSMs to which the cryptographic information is propagated. For example, an application key generated on a first HSM is encrypted with the fleet key on the first HSM. The encrypted application key can be provided to the HSM management hub and replicated to one or more additional fleet member HSMs. The additional fleet member HSMs are able to decrypt and use the application key using their duplicates of the fleet key. The HSM management hub does not have access to the fleet key, and therefore cannot decrypt or use the application key.

A fleet key can be installed on a new fleet-member HSM in a variety of ways. In some examples, the fleet key is installed by the manufacturer of the HSM at the time the HSM is made. In another example, the fleet key is installed on HSM using one or more pieces of physical computer readable media. The fleet key is divided into a number of segments and each segment is placed onto a separate piece of physical computer readable storage media such as an SD card, CDROM, or USB drive. The physical computer readable media are inserted into the new HSM, and the new HSM assembles and installs the fleet key.

Cryptographic information may be distributed across a number of HSMs using public-private key cryptography. In one example, a fleet key is installed on a new HSM using a public-private key pair generated by the new HSM. The new HSM provides the public key to a fleet member HSM, and the fleet member HSM encrypts the fleet key with the public key provided by the new HSM. The fleet member HSM provides the encrypted fleet key to the new HSM, and the encrypted fleet key is decrypted with the private key on the new HSM. In this way, the fleet key is not exposed in an unencrypted form outside the set of HSM in the fleet. In another example, an HSM management hub coordinates the distribution of the fleet key. The HSM management hub contacts the HSMs in the fleet, and causes each HSM in the fleet to generate an HSM-specific public-private key pair. Each HSM in the fleet provides the public key of the HSM-specific public-private key pair to the HSM management hub. The HSM management hub provides the collection of public keys to a fleet member HSM. The fleet member HSM generates the fleet key, and encrypts the fleet key with each public key provided by the HSM management hub. The collection of encrypted the keys is distributed via the HSM management hub to the members of the fleet. Each member of the fleet decrypts the fleet key with the member's HSM-specific private key.

HSM management functions can be implemented in a distributed fashion by the member HSMs. Communication between HSMs may be facilitated by a commonly accessible storage service, or by a peer-to-peer data sharing service implemented by the HSMs. In some examples, HSMs within a fleet connect to a network storage service using a shared storage-service account. HSMs in the fleet exchange shared information with the storage service in a protected format using a shared fleet key. The shared fleet key may be established across the fleet of HSMs using public-private key encryption as described above. In another example, HSMs within the fleet communicate with each in a peer-to-peer fashion other using public-private key encryption. Each HSM in the fleet communicates with a number of peer fleet member HSMs for which the HSM is provided with public keys.

By providing an HSM management hub that manages cryptographic information across a fleet of HSMs, persistent cryptographic objects created on one HSM can be automatically replicated to other HSMs in the fleet. If the HSM management hub fails, each HSM in the fleet may be able to continue functioning using locally-stored cryptographic information stored within each HSM. A secure communications channel may be created that relies on the replication of cryptographic information. For example, a secure network connection may be established between two network-connected hosts using a shared secret key. Each host is connected to an HSM that is a member of the HSM fleet. The shared secret key is generated on one HSM and replicated across the fleet of HSMs, providing the two network-connected hosts access to the shared secret key.

In some implementations, cryptographic information is exchanged between HSMs within the HSM fleet in a hierarchical or peer-to-peer fashion, and domain and fleet keys are distributed directly from an HSM management hub. By controlling the distribution of domain keys centrally, accurate access control can be maintained. Cryptographic information such as cryptographic keys are encrypted with one or more domain keys or the fleet key and distributed relatively freely between HSMs within the HSM fleet. Only HSMs that have the corresponding domain or fleet keys may access the cryptographic information.

Cryptographic information can be backed up using stored services outside the HSM fleet. In some examples, backup cryptographic information is generated on HSM and encrypted using a fleet key. The encrypted backup information is transmitted to a storage service where it is maintained in encrypted form. In another example, backup cryptographic information is generated on HSM and split into a number of backup stripes which are distributed across HSMs in the HSM fleet. Parity information is generated that enables recovery from the loss of one or more backup stripes. The parity information may be maintained on an HSM management hub, or an external storage service. If an HSM failure occurs within an HSM fleet, the parity information can be recovered and used to regenerate the lost backup stripe.

FIG. 1 shows an illustrative example of an environment in which various embodiments may be practiced. A diagram 100 includes an HSM management hub that manages a number of HSMs that are members of an HSM fleet. The HSM fleet includes a first HSM 104, a second HSM 106, and a third HSM 108. The first HSM 104, the second HSM 106, and the third HSM 108 retain cryptographic information 112, 114, and 116 respectively which is synchronized by the HSM management hub 102 across the fleet. When cryptographic information is exchanged between the HSMs 104, 106, and 108, and the HSM management hub 102, the cryptographic information is cryptographically protected using a fleet key 118, 120, and 122, that is synchronized across the HSM fleet.

The fleet key is a cryptographic key used to protect the cryptographic information when the cryptographic information is transmitted outside the HSMs in the fleet. In some examples, the fleet key is a symmetric cryptographic fleet key. Cryptographic information can be encrypted using the symmetric cryptographic fleet key and transmitted from a source fleet-member HSM. After receipt by a recipient fleet-member HSM, the recipient can decrypt the protected cryptographic information using the symmetric cryptographic fleet key and merge the received cryptographic information with local cryptographic information stored on the recipient fleet-member HSM. In other examples, the fleet key is an asymmetric cryptographic fleet key comprising a public fleet key and a private fleet key. A source fleet-member HSM can encrypt cryptographic information with the public fleet key and send the encrypted cryptographic information to a destination fleet-member HSM. The destination fleet-member HSM is able to decrypt the cryptographic information using the private fleet key, and then synchronize the received cryptographic information with local cryptographic information stored on the destination fleet-member HSM. Fleet-member HSMs are configured so that that the fleet key is not usable by HSM clients. In general, the fleet key is usable only by a fleet management agent within the HSM itself.

The fleet key may be created by the HSM management hub when the fleet is created. The HSM management hub creates the fleet by identifying an initial fleet-member HSM. The HSM management hub generates an administrative key that is used to sign fleet commands issued by the HSM management hub to fleet-member HSMs. The administrative key is an asymmetric key that includes a public key and a private key. The private key is maintained by the HSM management hub. The public key is distributed to the fleet-member HSMs to validate commands issued by the HSM management hub. In order to generate the initial fleet key, the HSM management hub provides the initial fleet-member HSM with the public key, and issues a signed command to generate a new fleet key.

The new fleet key can be distributed to new HSMs in the fleet without revealing the fleet key to the HSM management hub. In one example, the HSM management hub contacts a new fleet-member HSM, and requests that the new fleet-member HSM join the fleet. The HSM management hub provides the public administrative key to the new fleet-member HSM. The new fleet-member HSM generates a fleet-import public-private key pair for use in receiving the new fleet key. The new fleet-member HSM provides the fleet-import public key to the HSM management hub. The new fleet-member HSM may sign the fleet-import public key with an HSM manufacturer's key to indicate that the fleet-import private key resides within a secure HSM. The HSM management hub signs the fleet-import public key with the administrative key and provides the fleet-import public key to a fleet-member HSM that has fleet key. The fleet-member HSM encrypts the fleet key with the provided fleet-import public key after validating the HSM manufacturer's key and the administrative key signatures. The encrypted fleet key is returned to the new fleet-member HSM via the HSM management hub. The encrypted fleet key is decrypted using the fleet-import private key and installed on the new fleet-member HSM.

Communication between HSMs may occur in a variety of ways. In some implementations, communication between HSMs occurs via the HSM management hub 102. The HSM management hub 102 includes an HSM fleet manager 124 that interfaces with a fleet information store 126. The fleet information store 126 includes information that describes how to communicate with each member of the HSM fleet, information that describes how the HSM fleet is arranged, and encrypted copies of cryptographic information maintained by the fleet. The HSM fleet manager 124 periodically contacts each member of the HSM fleet and receives updated cryptographic material from each member of the HSM fleet. The updated cryptographic material is distributed to the remaining members of the HSM fleet. The cryptographic material is cryptographically protected with the fleet key before the cryptographic material leaves each HSM, and the cryptographic protection is removed after the cryptographic information arrives at each destination HSM using the fleet key. In another implementation, fleet-member HSMs communicate with each other in a peer-to-peer fashion. Cryptographic information may be transferred between HSMs in the fleet in a cryptographically protected format that is encrypted with the fleet key or, as an alternative, the cryptographic information may be exchanged between fleet-member HSMs using a secure transport protocol such as TLS that relies on a negotiated shared secret specific to the connection.

Updated cryptographic information may be generated on one HSM and synchronized across the fleet of HSMs to support requests for cryptographic operations from HSM clients. In one example, a client computer system is connected to the first HSM 104. The client computer system requests generation of a new cryptographic key for use by an application. The new cryptographic key is generated on the first HSM 104, and an identifier associated with the new cryptographic key is provided to the application. In general, the first HSM 104 does not provide the new cryptographic key in plaintext form to the application. The application requests that the HSM perform cryptographic operations using the new cryptographic key. In this way, the application may use the new cryptographic key to cryptographically protect application data that is stored or shared with other applications without accessing the new cryptographic key directly. If the protected application data is shared with other applications, and the other applications do not have access to the first HSM 104, the other applications may use other HSMs in the HSM fleet to decrypt the protected application data if the new cryptographic key is synchronized across the HSM fleet. If the client computer system requests that the new cryptographic key be synchronized across the HSM fleet, the first HSM 104 cryptographically protects the new application key with the fleet key, and then transmits the protected fleet key to the HSM management hub 102. The HSM management hub 102 transmits the protected new application key to the other HSMs in the fleet. The other HSMs in the fleet decrypt the protected new application key using the fleet key, and retain the new application key for use by HSM clients.

The HSM management hub 102 may be used to perform key rotation operations that are synchronized across the fleet of HSMs. In one example of key rotation, the HSM management hub 102 indicates to the first HSM 104 that the fleet key should be rotated. The first HSM 104 generates a new fleet key and cryptographically protects the new fleet key with the old fleet key. The cryptographically protected new fleet key is provided to the HSM management hub 102. The HSM management hub 102 provides the protected new fleet key to the remaining HSMs which decrypt and retain the new fleet key. If an HSM is unreachable, the HSM management hub 102 retains the protected new fleet key and can provide the protected new fleet key to the unreachable HSM if the unreachable HSM becomes available at a later time. In another example of key rotation, the HSM management hub 102 indicates to the first HSM 104 that an application key should be rotated. The first HSM 104 generates a new application key, and cryptographically protects the new application key with the original application key and the fleet key. The protected new application key is transmitted to the HSM management hub 102 and distributed to the remaining HSMs. Only HSMs that have access to both the original application key and the fleet key can access the new application key. If, for example, an HSM were stolen or compromised, the HSM management hub 102 could quickly rotate the fleet key of the remaining HSMs, and then rotate the remaining application and domain keys across the fleet using the new fleet key.

The HSM management hub 102 may retain protected cryptographic information in the fleet information store 126 for backup and recovery purposes. In one example, the HSM fleet manager 124 periodically requests a backup from an HSM in the fleet. The HSM cryptographically protects the cryptographic information stored on the HSM using the fleet key and provides the protected cryptographic information to the HSM fleet manager 124. The HSM fleet manager 124 stores the cryptographic information in the fleet information store 126 in protected form. The HSM management hub 102 cannot use the cryptographic information in the fleet information store 126 without access to the fleet key. In general, the fleet key is not usable outside the HSM fleet because the fleet key is non-exportable, and not usable by HSM clients. In a restore operation, the protected cryptographic information may be provided to an HSM fleet member, provided the HSM fleet member has already been provided with the fleet key.

If the fleet key needs to be restored as well, the target HSM generates a public-private key pair and provides the public key to a fleet member HSM that has the fleet key. The public key provided by the target HSM may be signed with an HSM manufacturer's key and a fleet administrator's key to indicate that the associated private key is securely retained within an HSM and authorized to receive the fleet key. The fleet member HSM encrypts the fleet key with the provided public key and returns the encrypted fleet key to the target HSM. The target HSM decrypts the encrypted fleet key with the private key and stores the resulting fleet key in the target HSM.

Figure 2:
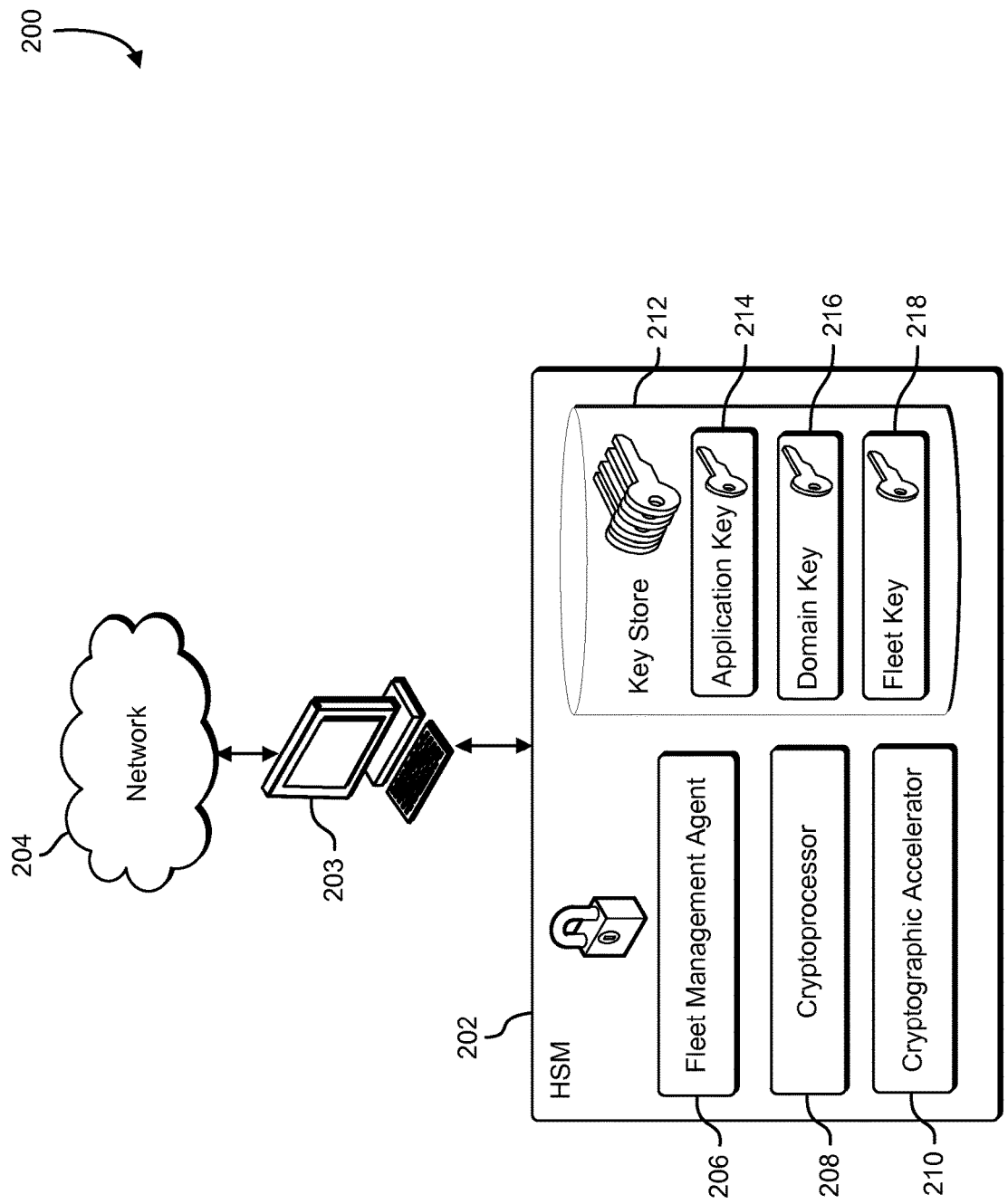
FIG. 2 shows an illustrative example of an HSM with fleet-management features, in accordance with an embodiment.

FIG. 2 shows an illustrative example of an HSM with fleet-management features, in accordance with an embodiment. A diagram 200 shows an HSM 202 that is connected to a network 204 via a client computer system 203. In some examples, the HSM 202 may be a directly connected HSM connected to the client computer system 203 via a USB or serial connection. In another example, the HSM 202 may be an internal HSM installed within the client computer system 203 such as a PCI card, a PCMCIA card, or an SD card. The client computer system 203 can be a personal computer, a laptop computer, a tablet computer, a mobile device, or cell phone that uses the HSM 202 to manage cryptographic keys and/or perform cryptographic operations.

The HSM 202 includes a fleet management agent 206. The fleet management agent 206 is able to connect to an HSM management hub via the network 204 by relaying information through the client computer system 203. In some implementations, the client computer system 203 includes a driver that acts as a communication relay between the fleet management agent 206 and a network interface on the client computer system 203. The driver relays messages received from the HSM management hub via the network interface to the fleet management agent 206, and relays messages transmitted by the fleet management agent 206 to the HSM management hub via the network interface on the client computer system 203.

The HSM 202 includes a crypto processor 208, and in some embodiments, a cryptographic accelerator 210. The crypto processor 208 is a tamper-resistant processor that carries out cryptographic operations in a secure environment. The crypto processor 208 does not reveal instructions or data on an external accessible bus in an unencrypted form. If an attempt is made to breach the physical security of the HSM 202, the crypto processor 208 will delete the data maintained within the crypto processor. Some HSMs include a cryptographic accelerator 210. The cryptographic accelerator 210 is a coprocessor that is able to perform computationally intensive cryptographic operations. The cryptographic accelerator 210 can offload cryptographic operations from the crypto processor 208 and, in some implementations, the client computer system 203.

The HSM 202 maintains a key store 212 that contains cryptographic material used by the HSM 202 and the client computer system 203. The key store 212 includes an application key 214, a domain key 216, and a fleet key 218. The application key 214 is a cryptographic key used by an application on the client computer system 203. The application key 214 is generated on the HSM 202 at the request of the application. Cryptographic operations may be requested by the application and performed by the HSM 202 using the application key 214, but the application key 214 is not exposed outside the HSM 202. The domain key 216 is a symmetric cryptographic key that is shared across to a set of HSMs within a larger fleet of HSMs. The domain key 216 is replicated across the set of HSMs. Cryptographic material such as the application key 214 may be assigned to the domain and encrypted with a domain key 216. The encrypted cryptographic material is replicated across the set of HSMs in the domain to provide the set of HSMs with access to the cryptographic material. In some implementations, the encrypted cryptographic material is replicated across the entire fleet of HSMs, but only the HSMs in the set of HSMs are able to access the cryptographic material because only the HSMs in the set of HSMs have access to the domain key 216. The fleet key 218 is a symmetric cryptographic key shared across a domain of HSMs managed by an HSM management hub. The fleet key 218 and the domain key 216 may be used only within the HSM 202 by the crypto processor 208 or the cryptographic accelerator 210. With a domain key 216 or the fleet key 218, the HSM 202 may encrypt cryptographic material from within the HSM 202 and export the encrypted cryptographic material outside the HSM 202, or the HSM 202 may import encrypted cryptographic material from outside the HSM 202 and decrypt the encrypted cryptographic material for use within the HSM 202.

The fleet key 218 may be established across the fleet of HSMs in a number of ways. In some implementations, the fleet key 218 is preinstalled by the manufacturer of the HSM 202. While the HSM 202 is being manufactured, the fleet key 218 can be written directly to the key store 212 using methods that are inaccessible after the manufacturing process is complete. In another implementation, the fleet key 218 is installed using physical media that is inserted directly into the HSM 202. The fleet key 218 is divided into a number of segments which are distributed across a number of pieces of physical media. The pieces of physical media are inserted directly into the HSM 202, and the HSM 202 imports the fleet key into the key store 212. In yet another implementation, the fleet key 218 is generated by an HSM within the fleet and distributed to the remaining fleet members by encrypting the fleet key with an asymmetric cryptographic key generated by each of the remaining fleet members. For example, the fleet key may be transmitted from a source HSM to the destination HSM by generating a public-private key pair on the destination HSM, providing the public key to the source HSM, and encrypting the fleet key on the source HSM using the public key, and then sending the encrypted fleet key from the source HSM to the destination HSM. The destination HSM decrypts the encrypted fleet key with the private key. In yet another implementation, the fleet key may be transmitted from one HSM in the fleet to another HSM in the fleet using a secure transport protocol such as TLS that negotiates shared secret using a shared secret negotiation protocol such as the Diffie-Hellman key exchange algorithm.

Figure 3:
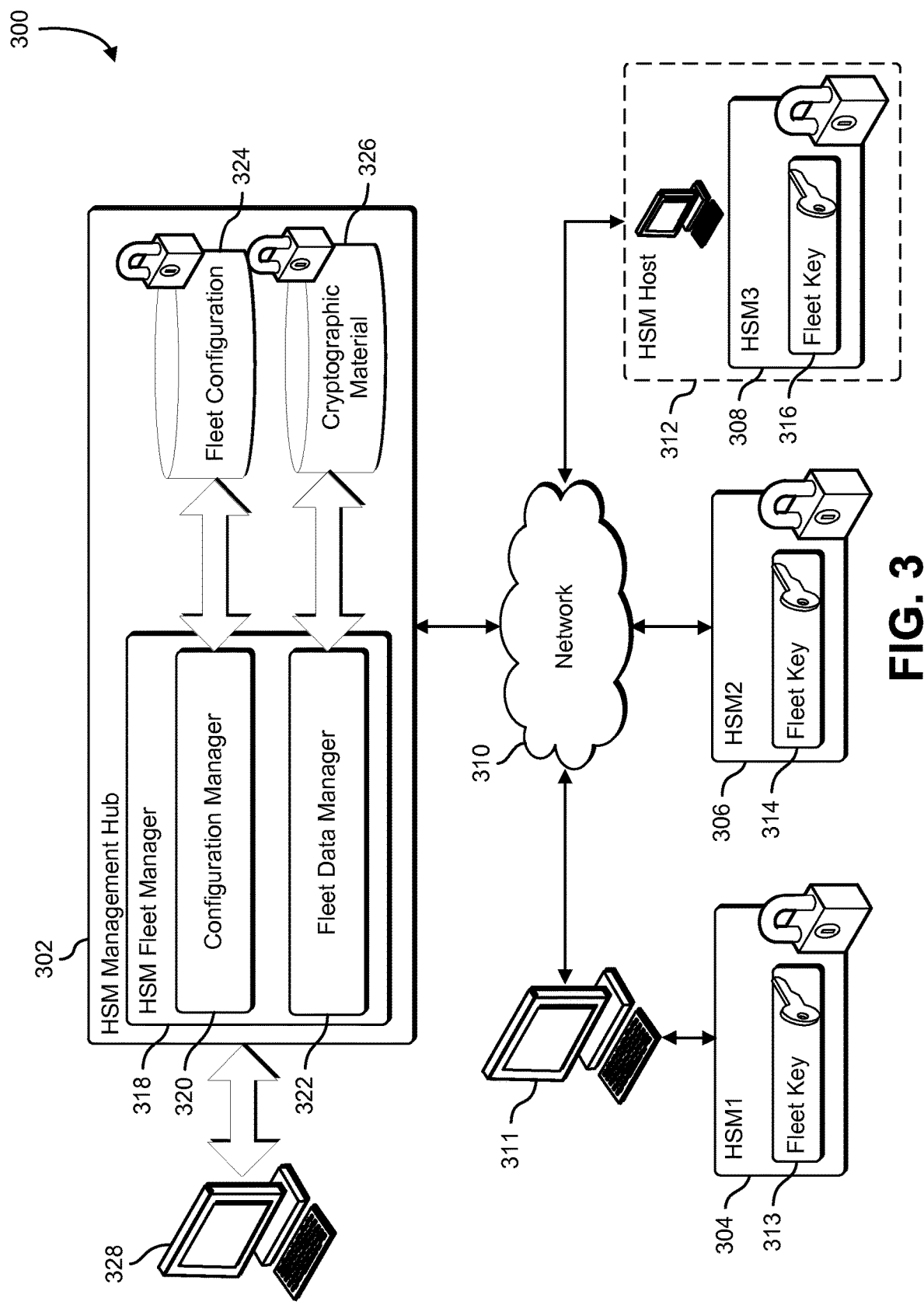
FIG. 3 shows an illustrative example of an HSM management hub configured to manage a number of HSMs as a fleet, in accordance with an embodiment.

FIG. 3 shows an illustrative example of an HSM management hub configured to manage a number of HSMs as a fleet, in accordance with an embodiment. A diagram 300 includes an HSM management hub 302 that manages a first HSM 304, a second HSM 306, and a third HSM 308 through a network 310. The first HSM 304 is a directly connected HSM that is connected to a client computer system 311 via a USB or serial connection. The first HSM 304 communicates with the HSM management hub 302 through the client computer system 311. The client computer system 311 includes a driver that relays communications between the first HSM 304 and the HSM management hub 302. The second HSM 306 is a network connected HSM, and communicates with the HSM management hub 302 over the network 310. The third HSM 308 is an internal HSM that is installed within an HSM host computer system 312. The third HSM 308 may be a PCI card, or other internal peripheral that is compatible with the HSM host computer system 312. The third HSM 308 communicates with the HSM management hub 302 by relaying messages through the HSM host computer system 312. The HSM host computer system 312 may include a driver that relays messages between the third HSM 308 and the HSM fleet manager 318 a network 310. The first HSM 304, the second HSM 306, and the third HSM 308 are members of an HSM fleet, and each member of the HSM fleet has a copy of a fleet key 313, 314, and 316. Fleet-member HSMs may be network-connected HSMs that are connected directly to the network 310, or internal or direct-connected HSMs that are connected indirectly to the network 310 through a client computer system.

The HSM management hub 302 is a computing appliance or general purpose computer system that manages the fleet of HSMs. The HSM management hub 302 includes an HSM fleet manager 318. The HSM fleet manager 318 is an application that runs on the HSM management hub 302. The HSM fleet manager 318 has subcomponents that include a configuration manager 320 and a fleet data manager 322. The configuration manager 320 manages the hierarchy of the HSMs contained in the HSM fleet. For example, the configuration manager maintains information about the HSMs that belong to the HSM fleet such as the network address and port for communicating with each HSM in the HSM fleet, as well as domain membership information. The configuration manager 320 maintains the information about the HSMs in a fleet configuration store 324. Information maintained in the fleet configurations for 324 may be cryptographically protected using an administrative key maintained by the HSM management hub 302. The fleet data manager 322 manages the cryptographic material synchronized between HSMs in the HSM fleet. The cryptographic material may be stored temporarily or persistently in a cryptographic material store 326. The cryptographic material may include fleet keys, domain keys, and application keys that are synchronized between HSMs in the HSM fleet. The cryptographic material maintained in the cryptographic material store 326 is maintained in a cryptographically protected format generated by the HSMs in the HSM fleet. In general, cryptographic material exchanged between the HSMs is protected using the fleet key, and in some situations, additional cryptographic keys maintained within the HSMs. Cryptographic material exchanged between the HSMs may be additionally protected using an HSM manufacturer's key, a domain key, or an administrative key maintained by the HSM management hub.

An administrative console 328 is used to perform administrative functions with the HSM management hub 302. The administrative console 328 communicates with the HSM fleet manager 318 and allows an administrator to add or remove HSMs from the HSM fleet, arrange HSMs into domains within the HSM fleet, configure HSM backups, and configure fleet synchronization parameters. For example, the administrator can configure how often HSMs within the HSM fleet are polled for updated cryptographic material by the HSM management hub 302. The administrator can associate particular cryptographic material, such as an application key, with a particular domain. By associating particular cryptographic material with a particular domain, the cryptographic material is synchronized across the HSMs that are members of the domain. If the particular cryptographic material is associated with the HSM fleet, the cryptographic material is synchronized across the entire HSM fleet. If the particular cryptographic material is not associated with any particular domain or with the HSM fleet, the cryptographic material is not synchronized across any other HSMs.

Figure 4:
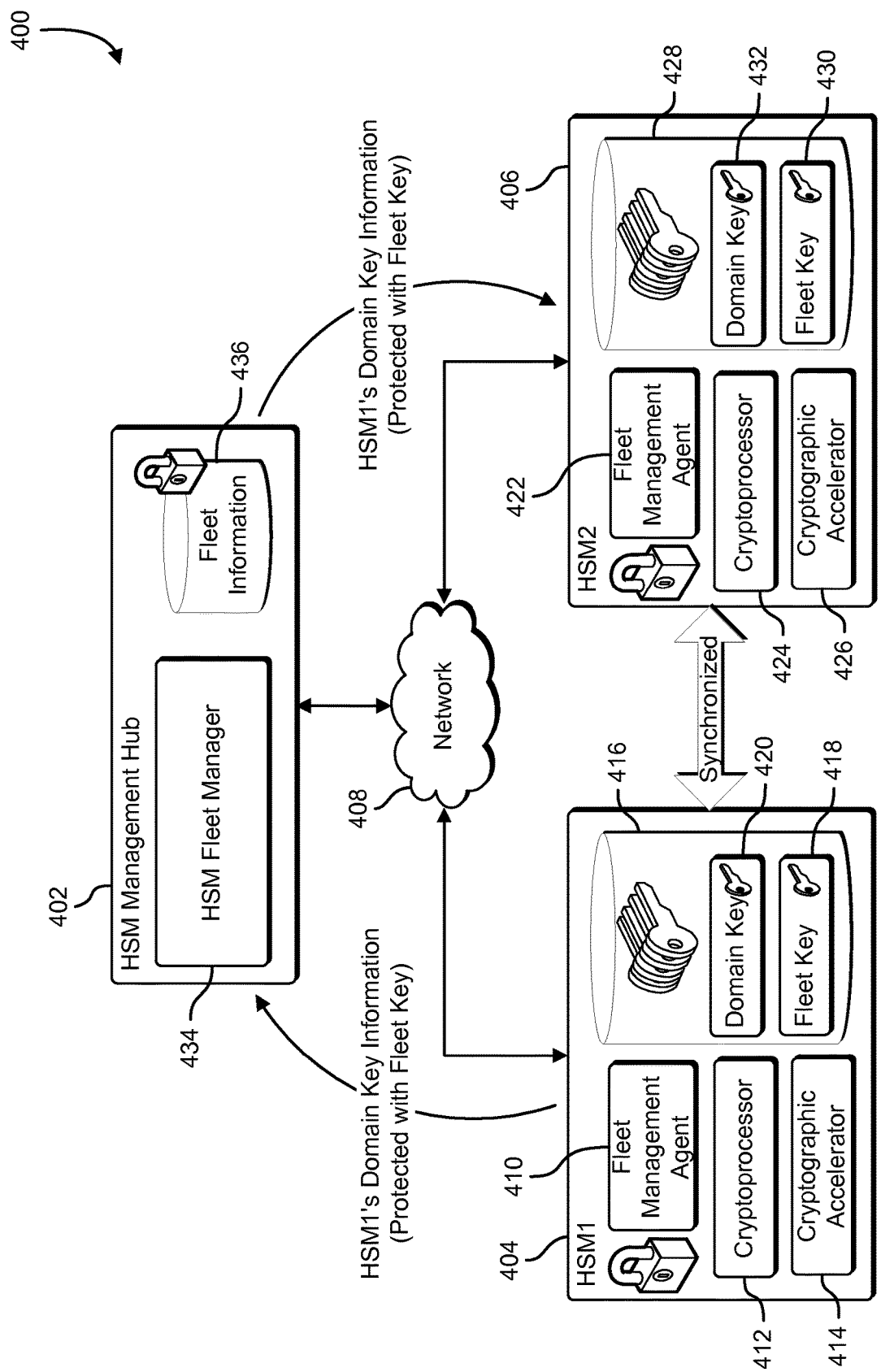
FIG. 4 shows an illustrative example of an HSM management hub establishing an HSM domain that includes two HSMs, in accordance with an embodiment.

FIG. 4 shows an illustrative example of an HSM management hub establishing an HSM domain that includes two HSMs, in accordance with an embodiment. A diagram 400 shows an HSM management hub 402 copying a domain key from a first HSM 44 to a second HSM 406 over a computer network 408. The first HSM 404 and the second HSM 406 may be directly connected to the computer network 408 or may be indirectly connected to the computer network 408 via an HSM client. The first HSM 404 includes a fleet management agent 410, a crypto processor 412, a cryptographic accelerator 414, and a cryptographic material store 416. The cryptographic material store 416 includes a fleet key 418 and a domain key 420. The second HSM 406 includes a fleet management agent 422 a crypto processor 424, a cryptographic accelerator 426, and a cryptographic material store 428. The cryptographic material store 428 includes a fleet key 430 that is a duplicate of the fleet key 418. A domain key 432 is an old version of the domain key 420 or, in some scenarios may not yet be present on the cryptographic material store 428. The HSM management hub 402 includes an HSM fleet manager 434 and a fleet information store 436.

The HSM management hub 402 synchronizes the domain key 420 on the first HSM 404 with the domain key 432 on the second HSM 406. The HSM management hub 402 detects that the first HSM 404 contains updated cryptographic information. In some implementations, the HSM fleet manager 434 contacts the fleet management agent 410 and inquires whether the first HSM 404 contains updated cryptographic information. The fleet management agent 410 determines whether the cryptographic material store 416 contains updated cryptographic information. If the cryptographic material store 416 contains updated cryptographic information, the fleet management agent 410 encrypts the updated cryptographic information using the fleet key 418 and returns the encrypted updated cryptographic information to the HSM fleet manager 434. In another implementation, the fleet management agent 410 detects when cryptographic material on the first HSM 404 has been updated. When cryptographic material on the first HSM 404 is updated, the fleet management agent 410 cryptographically protects the updated cryptographic material with the fleet key 418 and sends the protected updated cryptographic material to the HSM fleet manager 434. When the HSM fleet manager 434 receives updated cryptographic information, the HSM fleet manager 434 distributes the updated cryptographic information to other HSMs in the HSM fleet. In some implementations, the HSM fleet manager 434 distributes updated cryptographic information to all HSMs in the HSM fleet. In another implementation, the HSM fleet manager 434 distributes the cryptographic information based at least in part on domain membership of the cryptographic information.

Cryptographic information that is associated with a domain key can be cryptographically protected with the domain key in addition to being cryptographically protected with the fleet key before being distributed by an HSM. The HSM management hub may distribute the cryptographic information across the entire HSM fleet, but only HSMs with a domain key will be able to access the cryptographic information. In some implementations, the cryptographic information is protected with a domain key alone.

Communications between the HSM management hub 402 and the HSMs may be signed with an administrative key by the HSM management hub. The administrator key is a public-private key pair generated by the HSM management hub at the time the HSM fleet is formed. The public key of the administrative key is provided to the fleet-member HSMs. HSMs that receive messages from the HSM management hub can confirm the authenticity of the message by validating the message using the administrative key.

Figure 5:
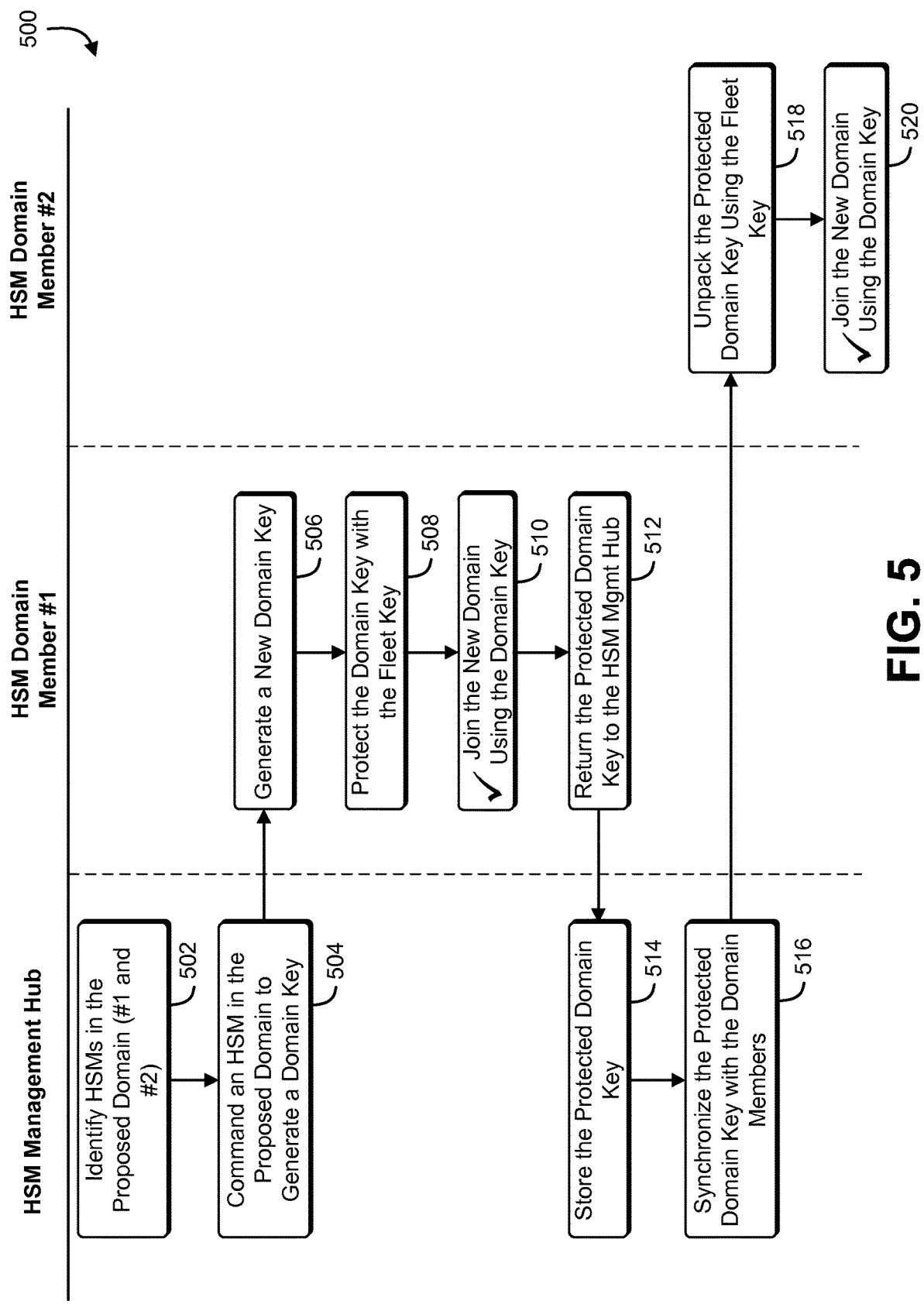
FIG. 5 shows an illustrative example of a process that, as a result of being performed by an HSM management hub, a first HSM in the fleet, and a second HSM in the fleet, establishes an HSM domain that includes the first and second HSMs, in accordance with an embodiment.

FIG. 5 shows an illustrative example of a process that, as a result of being performed by an HSM management hub, a first HSM in the fleet, and a second HSM in the fleet, establishes an HSM domain that includes the first and second HSMs, in accordance with an embodiment. A process diagram 500 shows a process that begins at block 502 with the HSM management hub identifying a set of HSMs to be added to a proposed domain. The set of HSMs are selected from fleet-member HSMs, so that each HSM in the proposed domain of HSMs has a copy of a fleet key. At block 504, the HSM management hub selects an HSM from the proposed domain of HSMs to generate the domain key, and sends the selected HSM a command to generate the domain key. The command to generate the domain key may be signed by the HSM management hub with an administrative key to indicate to the selected HSM that the command is authorized by a fleet administrator.

At block 506, the selected HSM receives the command to generate the domain key, and generates the domain key. In general, the domain key is a symmetric cryptographic key, but in some implementations, the domain key is an asymmetric cryptographic key pair. At block 508, the selected HSM uses the fleet key to cryptographically protect the newly generated domain key. The newly generated domain key may be cryptographically protected using a variety of encryption algorithm such as the advanced encryption standard ("AES"), data encryption standard ("DES"), blowfish, or CAST, which is described in RFC 2144, RFC 2612, and RFC 2984, which are hereby incorporated by reference. At block 510, the selected HSM joins the new domain by recording the new domain key. The new domain key is returned 512 to the HSM management hub, in a format that is encrypted with the fleet key.

At block 514, the HSM management hub stores the encrypted domain key. HSM management hub identifies the remaining members of the proposed domain of HSMs, and synchronizes 516 the encrypted domain key with the members of the proposed domain. The HSM management hub sends the encrypted domain key to a member of the proposed domain. At block 518, the member of the proposed domain unpacks the encrypted domain key using the fleet key to gain access to the domain key and use form. At block 520, the member of the proposed domain joins the new domain by recording the new domain key.

Domain keys and fleet keys allow HSMs to limit the distribution of cryptographic material across to the fleet of HSMs. By using a fleet key or a domain key, domains of HSMs can synchronize cryptographically protected information through the HSM management hub using a key that is not known outside the domain of HSMs. HSMs outside the domain of HSMs or non-HSM-based storage services may be used to store cryptographically protected information for backup purposes, and the cryptographically protected information cannot be used unless it is returned within the cryptographic domain of the keys used to protect the information.

Figure 6:
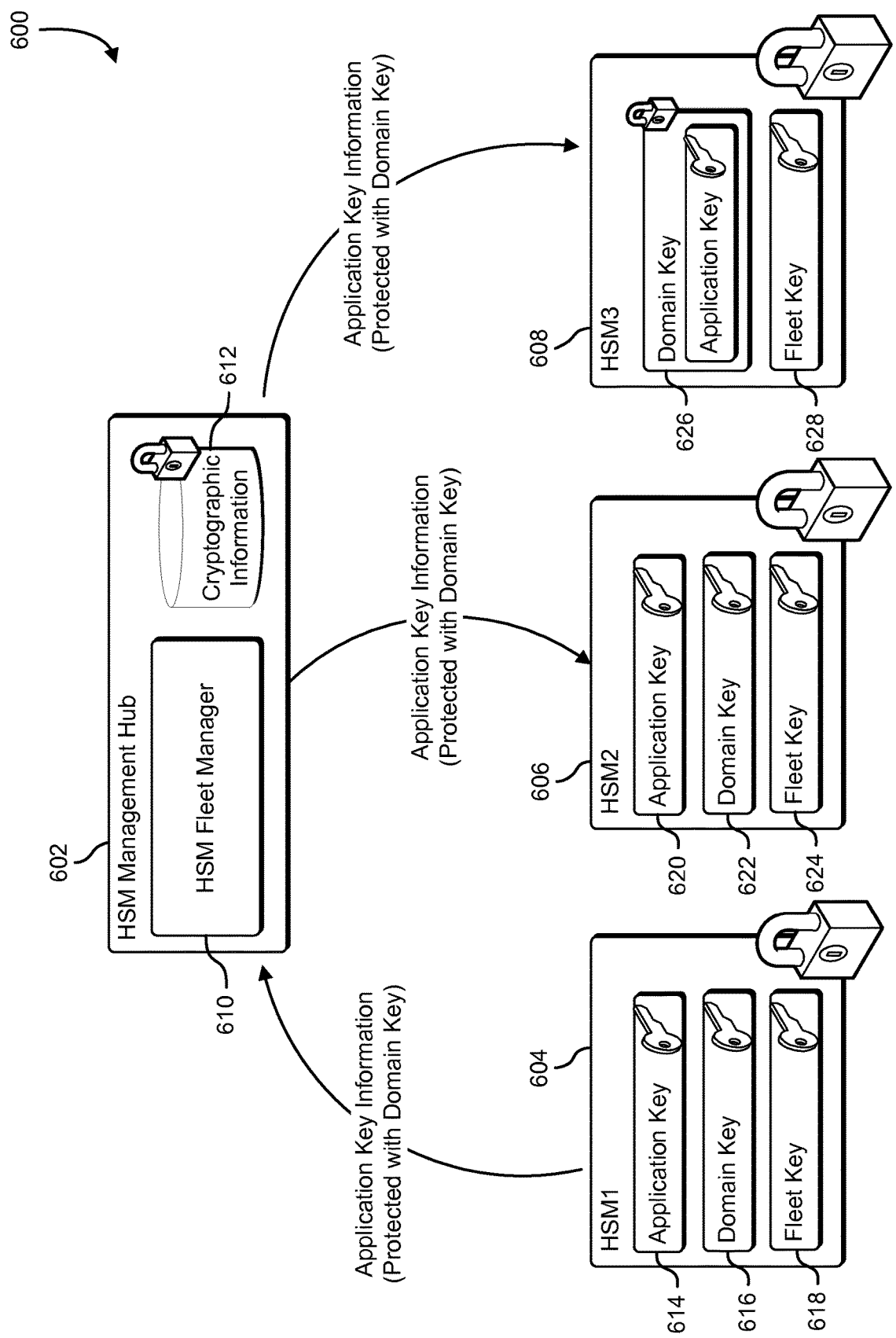
FIG. 6 shows an illustrative example of an HSM management hub synchronizing a domain key across a number of HSMs in a fleet, in accordance with an embodiment.

FIG. 6 shows an illustrative example of an HSM management hub synchronizing a domain key across a number of HSMs in a fleet, in accordance with an embodiment. A diagram 600 includes an HSM management hub 602 managing a fleet of three HSMs: a first HSM 604, a second HSM 606, and a third HSM 608. The HSMs in the fleet can be directly connected HSMs, internal HSMs are network connected HSMs. The HSM management hub includes an HSM fleet manager 610 and a cryptographic information store 612. The HSM fleet manager 610 synchronizes cryptographic material across the fleet of HSMs and the cryptographic information store 612 maintains hierarchical information describing the fleet structure and maintains cryptographic material in a protected format.

The HSM management hub 602 synchronizes an application key across the three HSMs in the fleet. The application key is associated with a domain, and the first HSM 604 and the second HSM 606 are members of the domain. The first HSM 604 retains the current application key 614. The first HSM 604 also includes a domain key 616 and a fleet key 618. The second HSM 606 includes a stale copy of the application key 620. The second HSM 606 also includes a copy of the domain key 622 and a copy of the fleet key 624.

The third HSM 608 does not have access to the domain key, but does have a second copy of the fleet key 628.

The application key is replicated across the fleet as follows. The first HSM 604 encrypts the current application key 614 using the domain key 616. The encrypted application key is transmitted to the HSM management hub 602 and received by the HSM fleet manager 610. In some implementations, the HSM fleet manager stores the encrypted application key in the cryptographic information store 612. The HSM fleet manager identifies the remaining members of the fleet and sends the encrypted application key to the remaining members. When the second HSM 606 receives the encrypted application key, the second HSM 606 decrypts the encrypted application key using the copy of the domain key 622, and the decrypted application key is used to update the stale copy of the application key 620. When the third HSM 608 receives the encrypted application key, the third HSM 608 retains the encrypted application key 626 on the third HSM 608 in encrypted form.

The encrypted application key 626 may be used to recover the application key if all HSMs that are members of the domain become available. In the case of disaster recovery, the HSM fleet manager 610 accesses the protected domain key from the cryptographic information store 612 and provides the protected domain key to the replacement HSMs. The replacement HSMs use the fleet key to restore the domain key. The HSM fleet manager extracts the encrypted application key 626 from the third HSM 608 and distributes the encrypted application key 626 to the replacement HSMs. The replacement HSMs extract the application key with the restored domain key, returning the fleet to its previous state.

Figure 7:
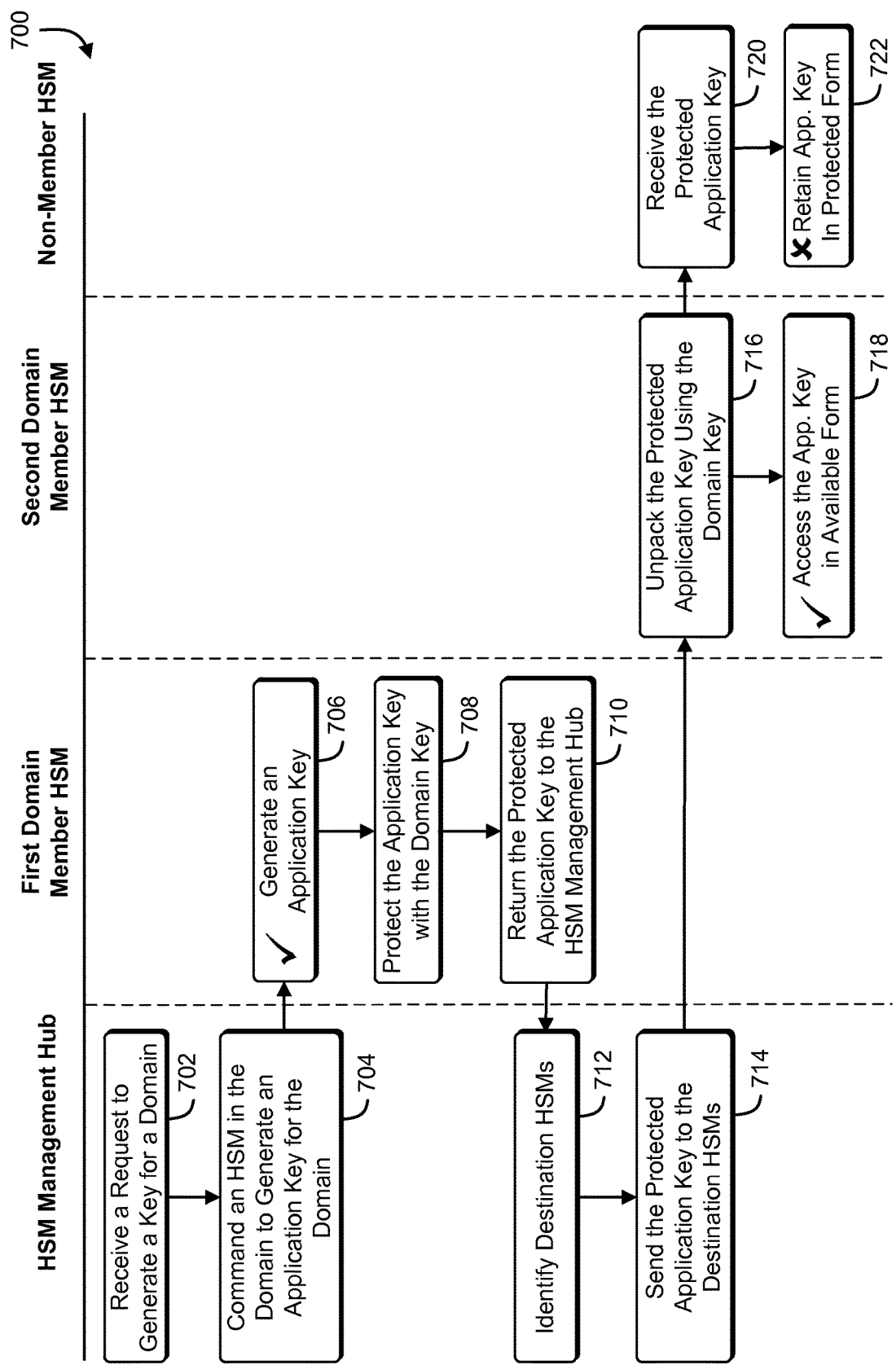
FIG. 7 shows an illustrative example of a process that, as a result of being performed by an HSM management hub, a first member HSM, a second member HSM, and a non-member HSM, synchronizes an application key across a number of HSMs in a fleet, in accordance with an embodiment.

FIG. 7 shows an illustrative example of a process that, as a result of being performed by an HSM management hub, a first member HSM, a second member HSM, and a non-member HSM, synchronizes an application key across a number of HSMs in a fleet, in accordance with an embodiment. A process diagram 700 illustrates a process that begins at block 702 where an HSM management hub receives a request to generate a new application key. In some situations, the request to generate a new application key may originate with an administrator and be received by the HSM management hub via an administrative console. In other situations, the request to generate the new application key may originate with an application hosted by a computer system that is connected to an HSM in the HSM fleet. The HSM management hub generates a command 704 to generate a new application key associated with the domain, and sends the command to a first domain member HSM. In some implementations, the command is signed with an administrative key owned by the HSM management hub.

At block 706, the first domain member HSM receives the command to generate a new application key. The first domain member HSM generates the application key using random or pseudorandom number generation techniques. At block 708 the first domain member HSM cryptographically protects the application key using the domain key stored on the first domain member HSM. The application key may be cryptographically protected using various encryption techniques described elsewhere in this application. At block 710, the first domain member HSM returns the protected application key to the HSM management hub.

HSM management hub identifies 712 the destination HSMs for the newly generated application key. In some examples, the newly generated application key is distributed across the entire fleet of HSMs, and HSMs that are able to decrypt the newly generated application key install the application key for use by HSM clients. Applications that are not able to decrypt the newly generated application key may retain the application key as a backup for the HSM fleet, or may delete the unusable cryptographic information. At block 714 the HSM management hub distributes the protected application key to the destination HSMs.

A second domain member HSM receives the protected application key from the HSM management hub and unpacks 716 the protected application key using the domain key. At block 718, the second domain member HSM is able to access the application key in a usable format. At block 720, a non-member HSM receives the protected application key from the HSM management hub. The non-member HSM does not have access to the domain key, and therefore is unable to extract the application key into a usable format. At block 722, the non-member HSM retains the application key in protected format as a backup for the domain member HSMs.

Figure 8:
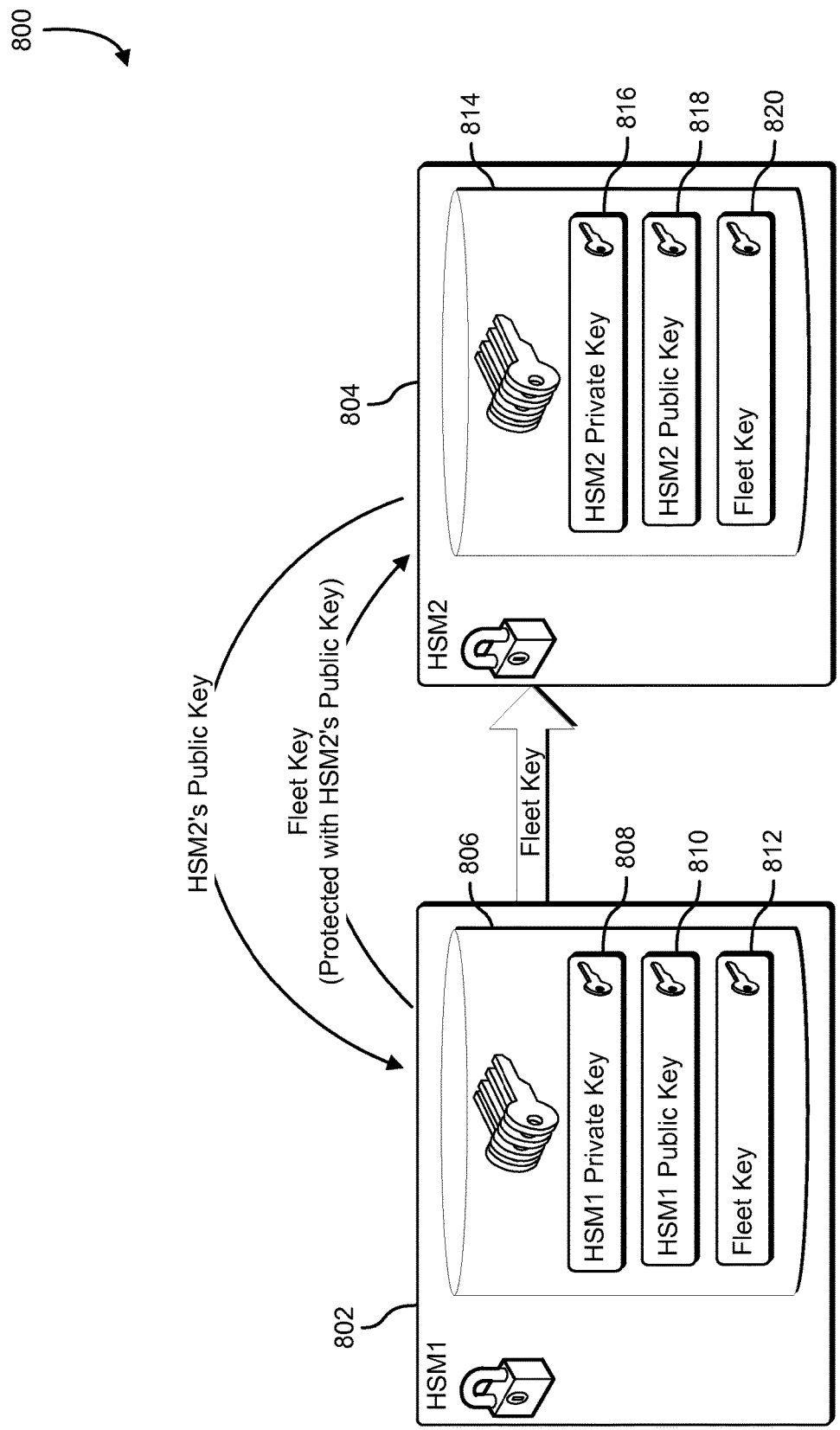
FIG. 8 shows an illustrative example of two HSMs synchronizing a fleet key, in accordance with an embodiment.

FIG. 8 shows an illustrative example of two HSMs synchronizing a fleet key, in accordance with an embodiment. A diagram 800 shows a first HSM 802 and a second HSM 804. The first HSM 802 retains a cryptographic data store 806. The cryptographic data store 806 includes a public-private cryptographic key pair associated with the first HSM 802. The public-private cryptographic key pair includes a first HSM private key 808 and a first HSM public key 810. The first HSM 802 maintains a current fleet key 812. The second HSM 804 does not have a copy of the current fleet key. The second HSM 804 includes a cryptographic data store 814. The cryptographic data store 814 maintains a public-private cryptographic key pair associated with the second HSM 804. The public-private cryptographic key pair includes a second HSM private key 816 and a second HSM public key 818. An out-of-date fleet key 820 may be present on the cryptographic data store 814. In some scenarios, the second HSM 804 may not have any fleet key.

The current fleet key 812 may be replicated from the first HSM 802 to the second HSM 804 without exposing the fleet key in an unprotected format outside the HSMs. The second HSM 804 provides the second HSM public key 818 to the first HSM 802. The first HSM 802 cryptographically protects the current fleet key 812 with the received second HSM public key 818. The first HSM 802 transmits the protected current fleet key 812 to the second HSM 804. The second HSM 804 receives the protected current fleet key, and decrypts the protected current fleet key using the second HSM private key 816. The decrypted fleet key is used to update the out-of-date fleet key 820. In some embodiments, keys may be transmitted indirectly through an HSM management hub. The HSM management hub can be used to sign and authenticate requests and exchanges of cryptographic information between HSMs.

Figure 9:
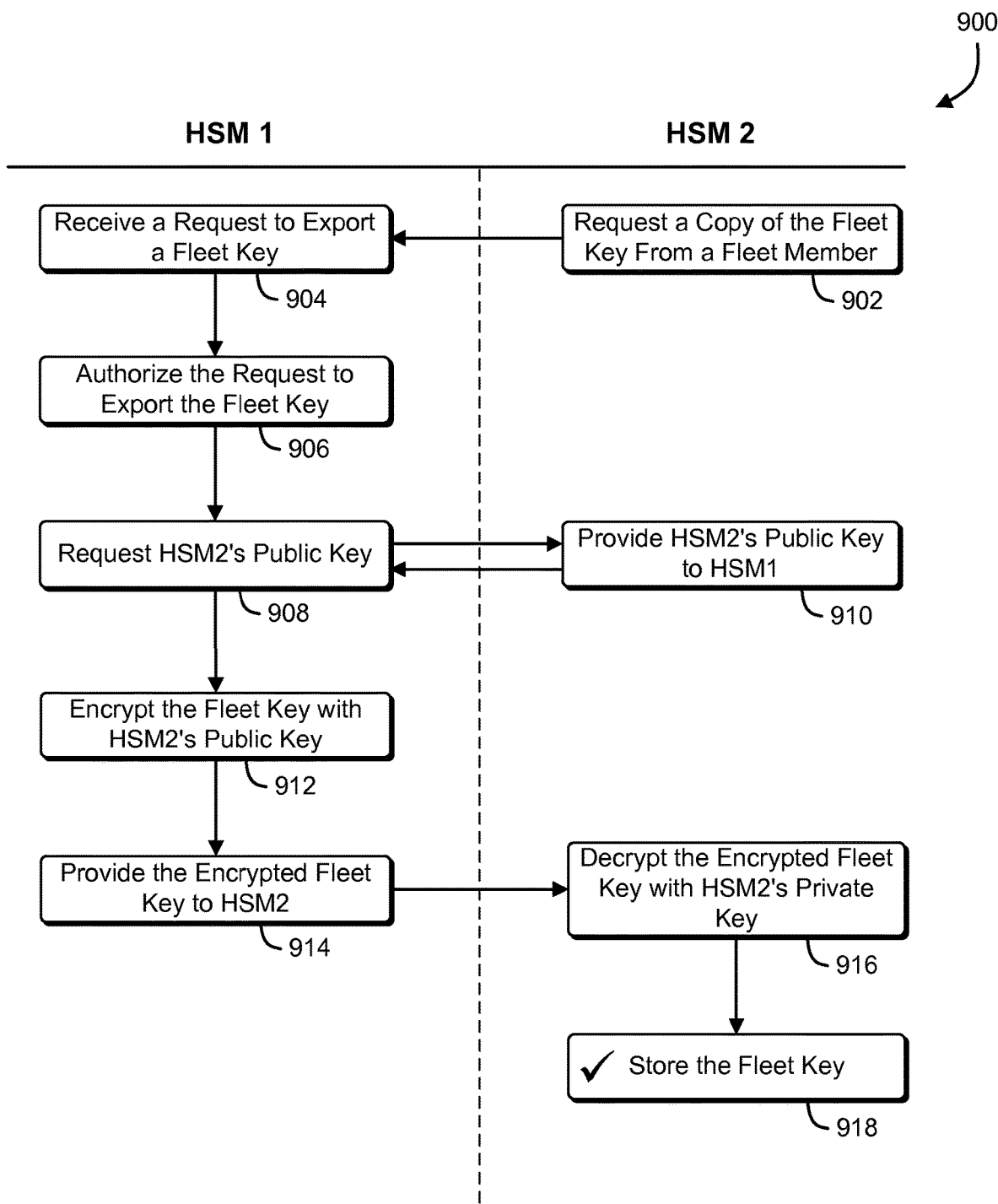
FIG. 9 shows an illustrative example of a process that, as a result of being performed by a first HSM and a second HSM, copies a fleet key from the first HSM to the second HSM, in accordance with an embodiment.

FIG. 9 shows an illustrative example of a process that, as a result of being performed by a first HSM and a second HSM, copies a fleet key from the first HSM to the second HSM, in accordance with an embodiment. A process diagram 900 illustrates a process that begins at block 902 where a second HSM requests a copy of a fleet key from a first HSM. The first HSM receives 904 the request for the fleet key from the second HSM. The first HSM authorizes the request at block 906. The request may be authorized by verifying a signature on the request or by confirming the request with an HSM management hub that manages the fleet. Identifying information on the second HSM may be compared to information maintained by the HSM management hub to confirm that the second HSM is an authorized fleet member.

The fleet key is provided from the first HSM to the second HSM in a protected format so that the fleet key is not revealed outside the context of the HSMs. At block 908, the first HSM requests a public key from the second HSM. The second HSM generates a public-private key pair and provides 910 the public key to the first HSM. The first HSM receives the public key from the second HSM and then encrypts 912 the current fleet key with the received public key. The encrypted current fleet key is transmitted 914 to the second HSM. The second HSM receives the encrypted current fleet key, and then decrypts 916 the encrypted current fleet key with the private key of the public-private key pair. At block 918, the second HSM stores the current fleet key and becomes a member of the HSM fleet.

In some embodiments, multiple hardware security modules can be used to securely provide a set of keys from one hardware security module to the other. Each security module may be provided with a common domain key. A hardware security module may encrypt cryptographic material using the domain key and provide the encrypted cryptographic material to another hardware security module, which can use its own copy of the domain key to decrypt the cryptographic material. A domain key may be provided to a hardware security module using secure transfer methods, such as public-key key exchange algorithms. Various other security measures, such as conditions on quorums of operators of security modules may also be utilized in accordance with the various embodiments. Additional information may be found in U.S. patent application Ser. No. 13/765,283, filed Feb. 12, 2013, which is incorporated herein by reference.

Figure 10:
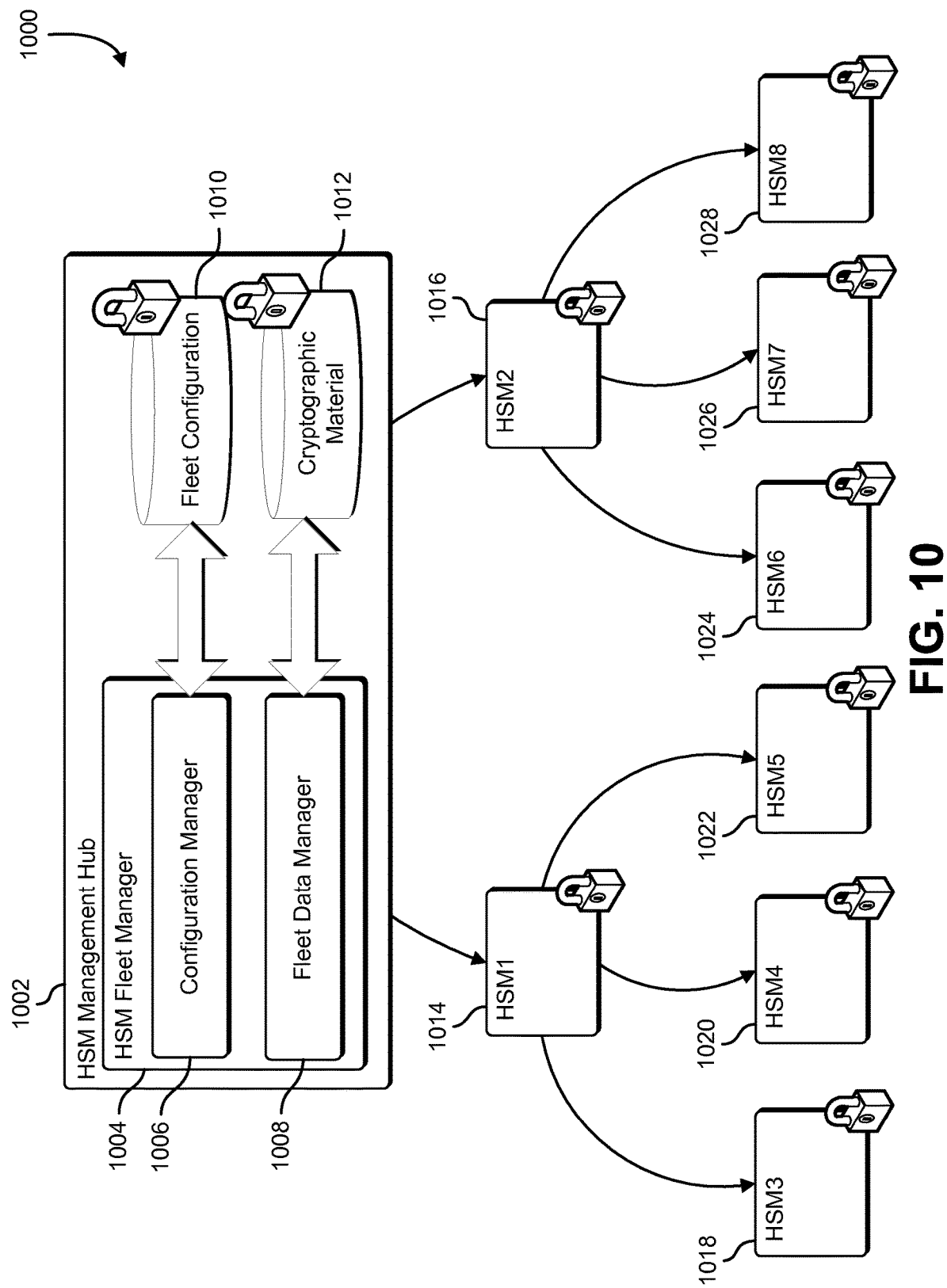
FIG. 10 shows an illustrative example of an HSM management hub distributing fleet-configuration information and cryptographic material to a fleet of HSMs through a hierarchical distribution network, in accordance with an embodiment.

FIG. 10 shows an illustrative example of an HSM management hub distributing fleet-configuration information and cryptographic material to a fleet of HSMs through a hierarchical distribution network, in accordance with an embodiment. A diagram 1000 shows a system that includes an HSM management hub 1002 that is in communication with a fleet of HSMs. The HSM management hub 1002 includes an HSM fleet manager 1004. The HSM fleet manager 1004 includes a number of software components, such as a configuration manager 1006 and a fleet data manager 1008, that implement management functions supported by the HSM management hub 1002. The configuration manager 1006 maintains a fleet configuration data store 1010. The fleet configuration data store 1010 includes information that identifies the HSMs in the fleet of HSMs managed by the HSM management hub 1002. The fleet configuration data store 1010 may include information that describes how the HSM management hub 1002 communicates with each HSM, as well as the role of each HSM within the fleet. For example, the fleet configuration data stored 1010 may include information that identifies particular subgroups of HSMs within the HSM fleet. The fleet data manager 1008 maintains information in a cryptographic material store 1012. The cryptographic material store 1012 retains cryptographic keys and other sensitive material provided by the HSMs in the HSM fleet. Cryptographic material maintained in the cryptographic material store 1012 is maintained in a protected format. In some examples, the cryptographic material is encrypted with a fleet key.

The fleet of HSMs is arranged in a hierarchy. The HSM management hub 1002 distributes fleet configuration information as well as updates to cryptographic material to HSMs within the HSM fleet through a number of intermediate HSMs. The fleet of HSMs includes a first tier of HSMs and a second tier of HSMs. The first tier of HSMs includes a first HSM 1014 and a second HSM 1016. The second tier of HSMs includes a third HSM 1018, a fourth HSM 1020, and a fifth HSM 1022 arranged hierarchically under the first HSM 1014. A sixth HSM 1024, a seventh HSM 1026, and an eighth HSM 1028 are arranged under the second HSM 1016. By arranging the HSM in a hierarchy, fleet configuration information and cryptographic material may be quickly distributed from the HSM management hub 1002 to the members of the HSM fleet. The HSM management hub distributes information to the first HSM 1014 and the second HSM 1016. The first HSM distributes the received information to the third HSM 1018, the fourth HSM 1020, and fifth HSM 1022. The second HSM distributes information to the sixth HSM 1024, the seventh HSM 1026, and the eighth HSM 1028. The HSM fleet may be arranged to provide desired fan-out characteristics when distributing information from the HSM management hub 1002.

The hierarchy of HSMs may be arranged based at least in part on the interconnections of individual HSMs within the HSM fleet. In some examples, a number of network HSMs may be connected to a common network segment. A particular HSM selected from the number of network HSMs is selected to act as a master, and receives updates from the HSM management hub 1002. As a result of receiving updates from the HSM management hub 1002, the master HSM distributes the updates to the remaining HSMs that are connected to the network segment. In another example, a host computer system acts as a master node distributing information to a number of connected HSMs such as PCI-connected internal HSMs or USB-connected external HSMs connected to the host computer system. The host computer system includes a driver that is in communication with the HSM management hub 1002. The driver receives updated fleet configuration information and/or cryptographic material from the HSM management hub 1002, and relays the updates to HSMs connected to the host computer system. By distributing information in a hierarchical fashion, updates can be distributed rapidly across the fleet of HSMs. In some implementations, individual HSMs or the HSM management hub 1002 can employ broadcast functionality to distribute protected fleet configuration or cryptographic material to a number of HSMs simultaneously.

Figure 11:
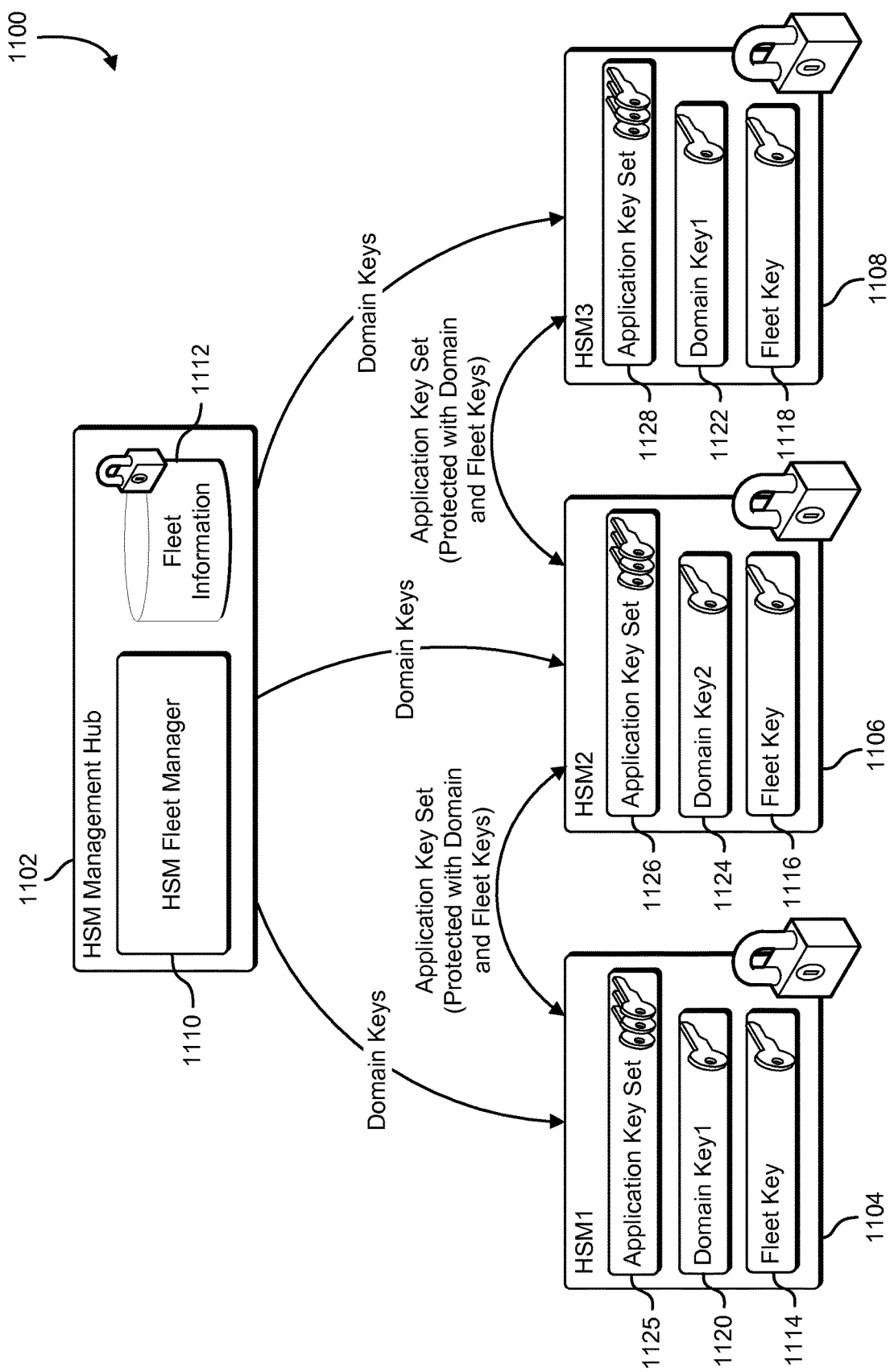
FIG. 11 shows an illustrative example of an HSM management hub distributing fleet-configuration information to a fleet of HSMs through a hierarchical distribution network, and the fleet of HSMs distributing cryptographic material throughout the fleet using peer-to-peer distribution, in accordance with an embodiment.

FIG. 11 shows an illustrative example of an HSM management hub distributing fleet-configuration information to a fleet of HSMs through a hierarchical distribution network, and the fleet of HSMs distributing cryptographic material throughout the fleet using peer-to-peer distribution, in accordance with an embodiment. A system diagram 1100 includes an HSM management hub 1102 that manages a fleet of HSMs. The fleet of HSMs includes a first HSM 1104, a second HSM 1106, and a third HSM 1108. The HSM management hub 1102 is a computing appliance that includes an HSM fleet manager 1110. The HSM fleet manager 1110 is an executable component of the HSM management hub that maintains and distributes fleet information stored on a fleet information store 1112. The fleet information includes information that controls access to cryptographic keys maintained within the fleet of HSMs. The fleet information store 1112 includes domain keys which are encrypted with a fleet key accessible to the HSMs within the HSM fleet. The HSM management hub distributes the encrypted domain keys to selected HSMs within the HSM fleet. The selected HSMs form HSM groups that are enabled to use cryptographic information that is encrypted with particular domain keys. As a result of being encrypted with a domain key, cryptographic information such as application keys can be distributed freely between HSMs within the HSM fleet, and access to the cryptographic information is limited to those HSMs that have access to the appropriate domain keys and/or fleet key.

In the example illustrated in FIG. 11, a number of domain keys are distributed by the HSM fleet manager 1110 to the HSMs in the HSM fleet. The first HSM 1104, the second HSM 1106, and the third HSM 1108 each retain a copy of the fleet key 1114, 1116, and 1118 respectively. As a result of configuring the fleet of HSMs, the HSM fleet manager 1110 distributes a number of domain keys to selected HSMs within the HSM fleet. In the illustrated example, the HSM fleet manager 1110 distributes a shared domain key to the first HSM 1104 and the third HSM 1108. A first domain key 1120 is generated by the first HSM 1104, and encrypted using the fleet key 1114. The encrypted first domain key is transmitted to the HSM fleet manager 1110 and relayed to the third HSM 1108. The third HSM 1108 decrypts the encrypted first domain key and retains a copy of the first domain key 1122. The second HSM 1106 is provided with a second domain key 1124. Domain keys may be retained by the HSM management hub 1102 as part of the fleet information store 1112.

Cryptographic information such as encryption keys may be encrypted with particular domain keys and distributed across the HSM fleet in a peer-to-peer fashion. HSMs that have access to the appropriate domain key are able to decrypt the cryptographic information for use. HSMs that do not have access to the appropriate domain key may retain the encrypted cryptographic information for distribution to other HSMs, but may not decrypt and use the cryptographic information. The first HSM 1104 maintains an application key set 1125. The application key set 1125 can include a collection of cryptographic keys. Each cryptographic key in the collection of cryptographic keys may be encrypted by the fleet key 1114 and one or more domain keys present on the first HSM 1104. The application key set 1125 may be transmitted via a peer-to-peer protocol, broadcast, or otherwise provided to other HSMs in the fleet. In the example shown in FIG. 11, the first HSM 1104 transmits the application key set 1125 to the second HSM 1106. The second HSM 1106 transmits a copy of the application key set 1126 to the third HSM 1108. The third HSM 1108 stores an additional copy of the application key set 1128. The HSMs each contain identical application key sets. The first HSM 1104 and the third HSM 1108 are able to decrypt and use cryptographic keys from the application key sets that are encrypted with domain key 1 or the fleet key. The second HSM 1106 can decrypt and use cryptographic keys from the application key sets that are encrypted with domain key 2.

Distribution of fleet information such as domain keys is tightly controlled by the HSM management hub 1102, but distribution of cryptographic information encrypted with the domain keys may be exchanged between the HSMs using less controlled means such as network broadcast, gossip, or peer-to-peer protocols. This can enable the rapid distribution and synchronization of cryptographic information across the HSM fleet, while maintaining tightly controlled usage rights to the cryptographic information via the domain keys.

In some implementations cryptographic information is distributed throughout a fleet of HSMs using a gossip-style protocol. Gossip-style protocols are described in pending U.S. patent application Ser. No. 14/740,218, filed Jun. 15, 2015, which is incorporated herein by reference.

Figure 12:
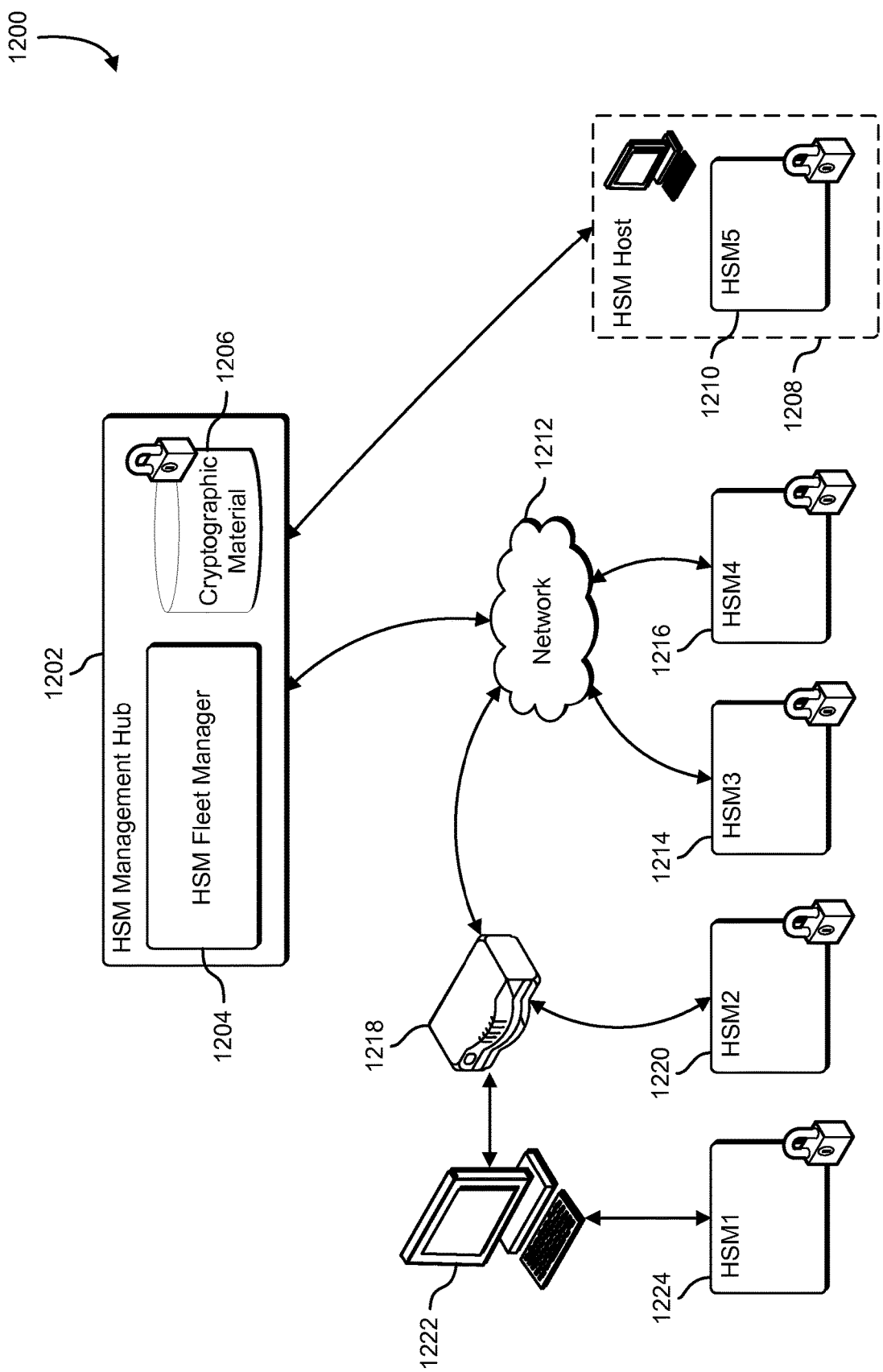
FIG. 12 shows an illustrative example of an HSM management hub participating in peer-to-peer distribution of network of cryptographic material throughout a fleet of HSMs, in accordance with an embodiment.

FIG. 12 shows an illustrative example of an HSM management hub participating in peer-to-peer distribution of network of cryptographic material throughout a fleet of HSMs, in accordance with an embodiment. A diagram 1200 shows a system that includes a variety of HSMs that are interconnected in an ad hoc peer-to-peer network. An HSM management hub 1202 includes an HSM fleet manager component 1204 that manages a database of cryptographic material 1206. The cryptographic material includes encryption keys that are encoded with fleet or domain keys maintained by the HSMs in the fleet. The HSMs in the fleet are interconnected in a variety of ways. In HSM host 1208 is connected to the HSM management hub 1202 via a direct connection such as a FireWire or USB connection. The HSM host 1208 includes an internal HSM 1210. The internal HSM 1210 can be installed in the HSM host 1208 by a PCI interface, and ISA interface, and EISA interface, a PC card interface, or other internal interface supported by the HSM host 1208. Additional HSMs are connected via a network 1212. A first network-connected HSM 1214 and a second network-connected HSM 1216 are connected directly to the network 1212. The first network-connected HSM 1214 and the second network-connected HSM 1216 can include network interfaces such as 10baseT Ethernet, 100baseT Ethernet, Gigabit Ethernet, token ring, FDDI, Wi-Fi, or cellular interfaces. The network router 1218 is connected to the network 1212 and provides an isolated subnet. A third network-connected HSM 1220 is connected via a network interface to the isolated subnet provided by the network router 1218. An HSM client computer 1222 is connected via the subnet to the network router 1218. The HSM client computer 1222 is connected to a directly connected HSM 1224. The directly connected HSM 1224 may be connected to the HSM client computer 1222 via a USB, FireWire, serial connection, RS-232 connection, Bluetooth connection, or other dedicated communication link.

Communications between the HSMs are orchestrated in a peer-to-peer fashion. For example, updates to cryptographic information that occur on the first network-connected HSM 1214 may be broadcast over the network 1212 to the second network-connected HSM 1216, the network router 1218, and the HSM management hub 1202. The network router 1218 repeats the updates to the third network-connected HSM 1220 and directly connected HSM 1224 via the HSM client computer 1222. The HSM management hub 1202 relays the updates to the internal HSM 1210 via the HSM host 1208. In some implementations, the fleet of HSMs implements a peer-to-peer protocol in accordance with the bit torrent protocol standard. Information describing the bit torrent standard can be found at http://www.bittorrent.org/beps/bep_0003.html.

Figure 13:
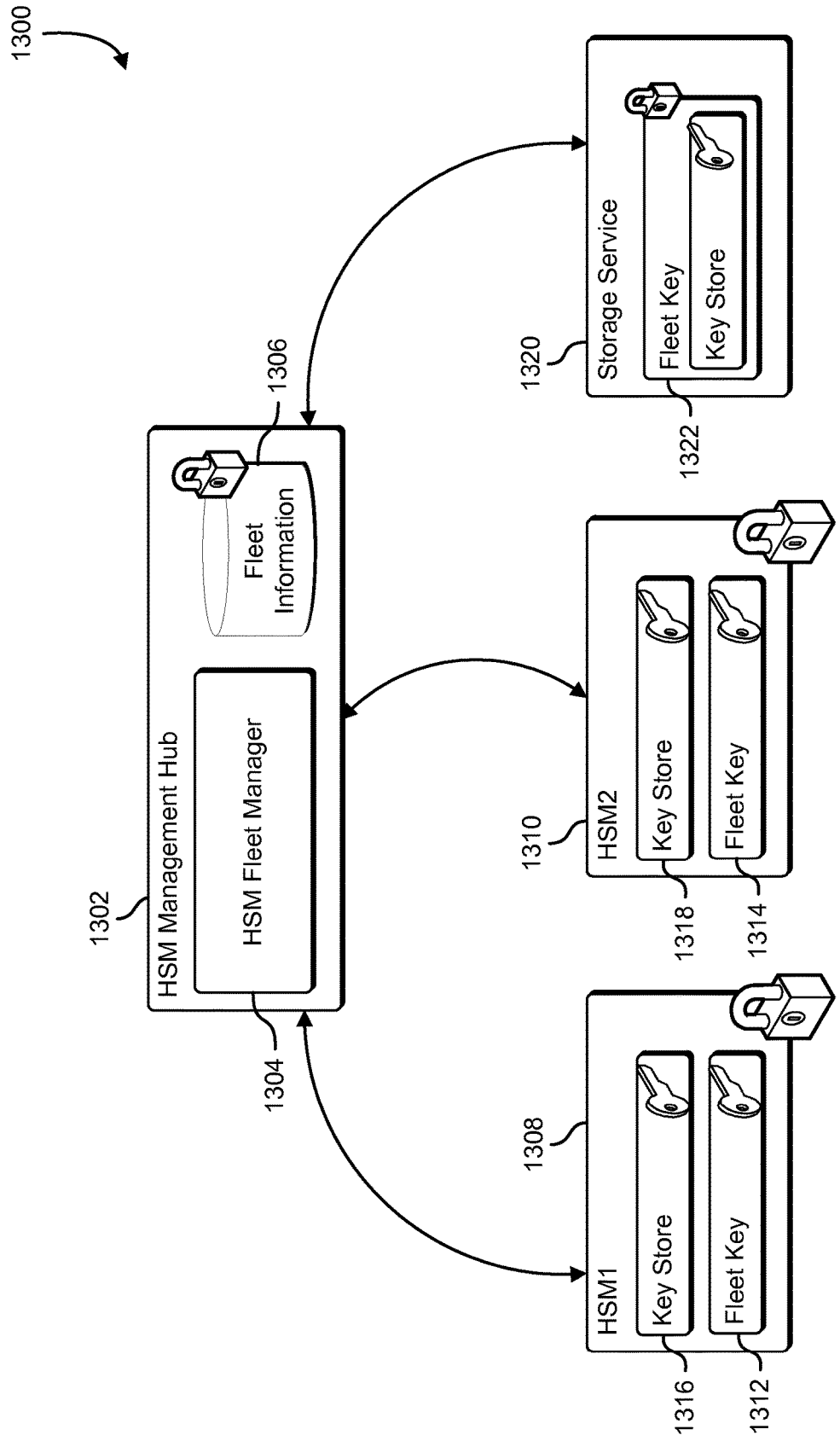
FIG. 13 shows an illustrative example of a storage service used for retaining protected cryptographic material maintained by a fleet of HSMs, in accordance with an embodiment.

FIG. 13 shows an illustrative example of a storage service used for retaining protected cryptographic material maintained by a fleet of HSMs, in accordance with an embodiment. A diagram 1300 shows an HSM fleet that uses a storage service for backing up cryptographic keys maintained by the fleet of HSMs. An HSM management hub 1302 includes an HSM fleet manager 1304 that maintains a fleet information database 1306. A first HSM 1308 and a second HSM 1310 comprise an HSM fleet managed by the HSM management hub 1302. The first HSM 1308 and the second HSM 1310 maintain copies of a fleet key 1312 and 1314 respectively. The first HSM 1308 and the second HSM 1310 maintain key stores 1316, and 1318 respectively. The key stores retain cryptographic information including encryption keys used by the HSMs in the fleet. The storage service 1320 is in communication with the HSM management hub 1302, and maintains an encrypted copy of the key store 1322 that is encrypted with the fleet key. The storage service 1320 is not an HSM, and may not use the keys maintained in the encrypted copy of the key store 1322 because the storage service 1320 does not have access to the fleet key. By maintaining an encrypted copy of the key store, the storage service 1320 enables backup and recovery services for the HSM fleet.

Updated cryptographic information including encryption keys is replicated across the fleet of HSMs and the storage service 1320. In one example, the first HSM 1308 generates an updated cryptographic key which is stored in the key store 1316. The updated key store is encrypted using the fleet key 1312 and transmitted to the HSM management hub 1302. The HSM management hub 1302 transmits the updated key store to the second HSM 1310 and storage service 1320. The second HSM 1310 decrypts the updated key store with a copy of the fleet key 1314, and reconciles the updated cryptographic information in the updated key store with the cryptographic information maintained in the key store 1318 on the second HSM 1310. The storage service 1320 receives the updated key store from the HSM management hub 1302, but cannot decrypt the updated key store because the storage service 1320 does not have access to the fleet key. Instead, the storage service 1320 retains the updated key store as the encrypted copy of the key store 1322.

If an HSM within the HSM fleet fails, information maintained by the storage service 1320 may be used to recover the cryptographic information lost by the failing HSM. In some examples, if an HSM in the HSM fleet fails, the failed HSM can be replaced by new HSM. The new HSM joins the fleet and is provided with the fleet key by another HSM in the fleet as described elsewhere in the present document. In some implementations the new HSM acquires the fleet key by restoring the fleet key from physical media. The storage service 1320 is contacted by the new HSM, and the storage service 1320 provides the new HSM with the most recent encrypted copy of the key store 1322. In some implementations, the HSM management hub 1302 detects the new HSM, and contacts the storage service 1320 to retrieve the most recent encrypted copy of the key store 1322. The HSM management hub 1302 ensures the new HSM is a member of the fleet, and provides the encrypted copy of the key store to the new HSM. In another implementation, the new HSM joins the fleet of HSMs, and then broadcasts a message to the fleet of HSMs requesting restoration of the key store. The storage service 1320 may respond to the broadcast message by providing the encrypted key store, or a current member of the HSM fleet may respond by encrypting its present key store with the current fleet key and providing it to the new HSM. The new HSM decrypts the encrypted copy of the key store with the fleet key, and restores the key store on the new HSM.

Figure 14:
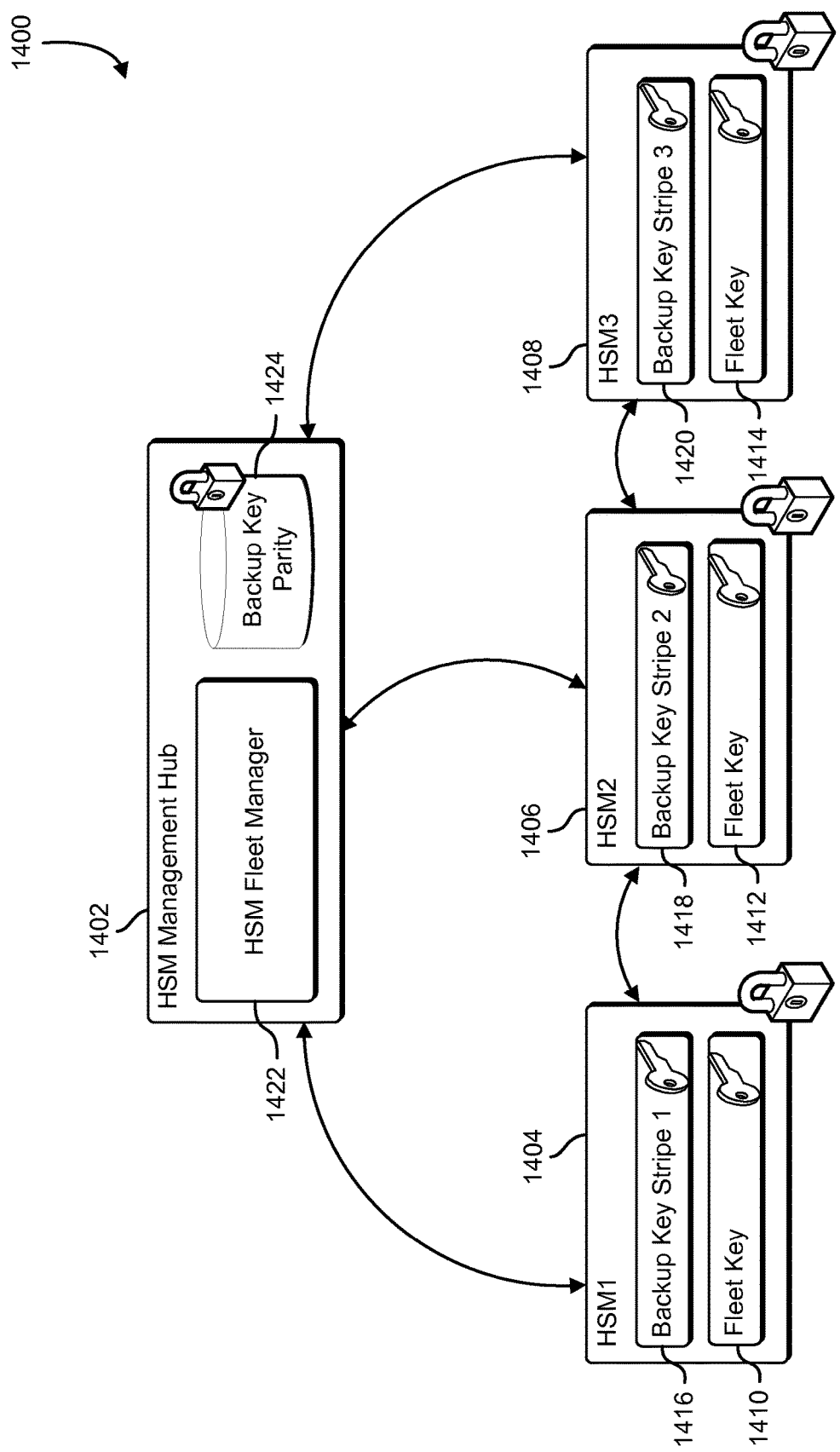
FIG. 14 shows an illustrative example of cryptographic material distributed across a fleet of customer HSMs, with associated parity information maintained by an HSM management hub, in accordance with an embodiment.

FIG. 14 shows an illustrative example of cryptographic material distributed across a fleet of customer HSMs, with associated parity information maintained by an HSM management hub, in accordance with an embodiment. A diagram 1400 shows a fleet of HSMs being managed by an HSM management hub 1402. The HSM management hub 1402 manages three HSMs: a first HSM 1404, a second HSM 1406, and a third HSM 1408. Each HSM in the fleet of HSMs maintains a copy of a fleet key 1410, 1412, and 1414. In various embodiments, the fleet of HSMs can maintain a backup of cryptographic information that is distributed across to a number of HSMs in the HSM fleet. In the example shown in FIG. 14, the first HSM 1404 retains a first backup key stripe 1416, the second HSM 1406 retains a second backup key stripe 1418, and the third HSM 1408 retains a third backup key stripe 1420. If the stripes are combined, they produce a complete backup of the cryptographic information retained on the HSM fleet. The HSM management hub 1402 includes an HSM fleet manager 1422 that maintains a backup key parity volume 1424. The backup key parity volume 1424 includes parity information that allows for the detection and, if necessary, recovery of one or more backup key stripes. In one example, the backup key parity volume 1424 includes a parity bit that allows recovery from the loss of a single backup key stripe. The information stored in the backup key parity volume 1424 may be designed to allow recovery from the loss of one, two, or more HSMs from the HSM fleet. The parity information described herein may be replaced with other types of error correcting codes such as Reed Solomon codes or erasure codes. Additional information on the design and implementation of error correcting codes may be found in "Error Correcting Codes" $2^{nd}$ edition by Peterson and Weldon, copyright 1972 by MIT. In various implementations, the cryptographic information may be divided into subsets, overlapping portions, or segments which may be treated as stripes for the purpose of generating parity information or error correcting codes.

The backup key parity volume 1424 may be maintained without revealing the cryptographic information maintained in the HSMs to the HSM management hub 1402. In one example, updated cryptographic information is generated on the first HSM 1404. The first HSM 1404 generates a backup volume containing the cryptographic information, and divides the volume into three stripes, and parity information. The first stripe is retained by the first HSM 1404. The second stripe is distributed to the second HSM 1406, and the third stripe is distributed to the third HSM 1408. The parity information is transmitted to the HSM management hub 1402 which stores the parity information in the backup key parity volume 1424.

If an HSM within the HSM fleet fails, the HSM management hub provides the parity information to a designated HSM in the fleet. The designated HSM assembles the backup stripes from the other HSMs in the fleet and combines this information with the parity information provided by the HSM management hub 1402 to reconstruct the missing backup stripe. The designated HSM restores the backup information, which may be used to restore the failed HSM or, in some implementations, may be used to redistribute the backup information across the remaining HSMs. In this way, cryptographic information maintained on an HSM fleet may be backed up using a relatively small amount of storage on each HSM. In addition, parity information may be hosted by storage services or management hubs that do not necessarily have access to the cryptographic information on the HSMs. The parity information allows for the recovery of lost cryptographic information on the HSMs without entrusting the cryptographic information to a third-party backup service.

The parity information can be used to achieve a level of data storage redundancy. If cryptographic information stored on an HSM becomes corrupted or is lost, the information may be recovered by combining the data on the remaining HSMs with parity information. In some implementations, the parity information is combined with a Boolean exclusive or ("XOR") operation to recover the lost information.

For example, if two HSMs contained the following data:
HSM 1: 01101101
HSM 2: 11010100

The parity information for the two HSMs can be determined by performing an XOR operation on the data. In the above example, the parity information would be:
HSM 1: 01101101
HSM 2: 11010100
Parity: 10111001

The resulting parity data, 10111001, can be stored on an HSM, on an HSM management hub, or storage service. If either HSM1 or HSM2 fails, the information stored on the failed HSM can be recovered from the information remaining on the other HSM by combining the remaining information with the parity information with an XOR operation.

For example, if HSM 2 failed, the data could be recovered by performing an XOR on the remaining data and the parity information.

HSM 1: 01101101
Parity: 10111001
Recovered HSM 2: 11010100

The result of that XOR calculation yields HSM 2's contents, 11010100. The recovery algorithm may be applied to larger numbers of HSMs. Parity information may be generated for 3, 4, or more HSMs and be used to recover from any single failure.

Figure 15:
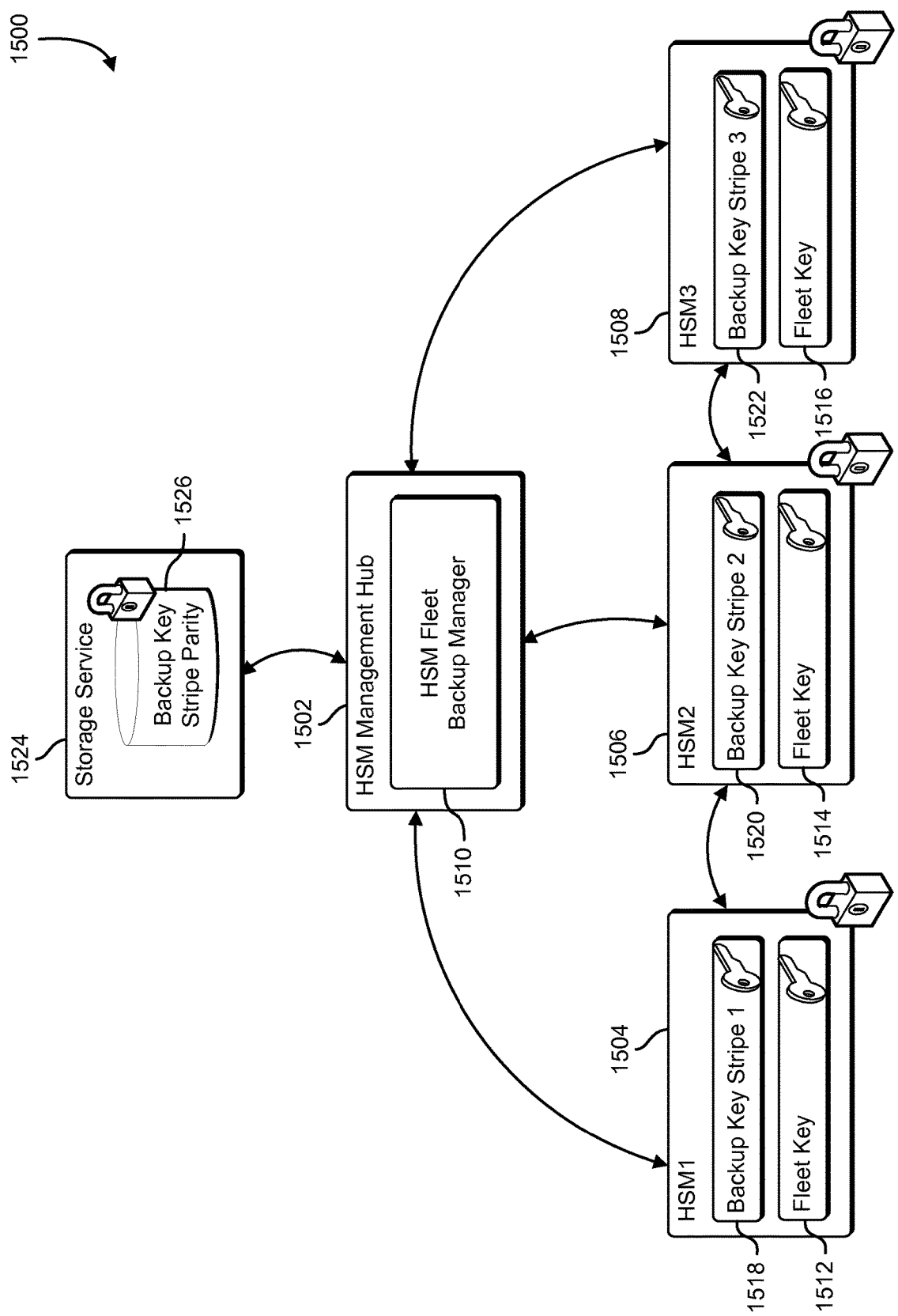
FIG. 15 shows an illustrative example of a storage service used to retain parity information for cryptographic information maintained by a fleet of HSMs, in accordance with an embodiment.

FIG. 15 shows an illustrative example of a storage service used to retain parity information for cryptographic information maintained by a fleet of HSMs, in accordance with an embodiment. An environment 1500 includes an HSM management hub 1502 that manages a fleet of three HSMs; a first HSM 1504, a second HSM 1506, and a third HSM 1508. The HSM management hub includes an HSM fleet backup manager 1510. The HSM fleet backup manager 1510 is an operational component that manages the backup and recovery of cryptographic information maintained by the HSM fleet. Each HSM in the HSM fleet maintains a copy of the fleet key 1512, 1514, and 1516. A backup volume is generated by a designated HSM, and divided into three backup key stripes. The first HSM 1504 retains a first backup key stripe 1518. The second HSM 1506 retains a second backup key stripe 1520, and the third HSM 1508 retains a third backup key stripe 1522. Parity information is provided by the designated HSM to the HSM fleet backup manager 1510. The HSM fleet backup manager 1510 utilizes one or more storage services 1524. The storage service 1524 retains a backup key stripe parity volume 1526, the contents of which are based at least in part on the parity information provided by the designated HSM. The backup information provided by the designated HSM is encrypted using the fleet key, and is provided to the storage service 1524 in encrypted form. The HSM fleet backup manager 1510 may utilize additional storage services to store additional parity information provided by the designated HSM. Dividing parity information across multiple storage service providers can provide additional security by making it more difficult for an attacker to acquire a significant portion of the cryptographic information maintained on the HSM fleet.

If an HSM in the HSM fleet fails, the HSM fleet backup manager 1510 retrieves the parity information from the storage service 1524. A replacement HSM is added to the HSM fleet and the fleet key is replicated from an existing HSM in the fleet to the replacement HSM. The HSM fleet backup manager 1510 provides the parity information to a designated HSM in the fleet. The designated HSM retrieves the remaining backup key stripes from the other HSMs in the fleet, and using the parity information, regenerates the missing stripe that was lost when the HSM failed. The missing stripe is provided to the new HSM. In some implementations, the parity information is provided to the replacement HSM. The replacement HSM retrieves the remaining backup key stripes from the other HSMs in the fleet, and is able to regenerate a complete backup volume using the parity information provided by the HSM fleet backup manager 1510, in addition to regenerating the missing backup key stripe.

In some examples, the HSM fleet backup manager 1510 detects that an HSM in the fleet of HSMs has failed, resulting in the loss of a backup key stripe. The HSM fleet backup manager 1510 identifies the location of the remaining stripes, and the parity information and assembles the remaining stripes and parity information within the HSM management hub 1502. The HSM management hub identifies the replacement HSM, and confirms that the replacement HSM has been provided with a copy of the fleet key. The HSM management hub provides the remaining stripes and the parity information to the replacement HSM, and the replacement HSM uses the fleet key to decrypt the remaining stripes and the parity information. The decoded stripes and parity information are used to regenerate the missing stripe, and restore the cryptographic information on the replacement HSM.

Figure 16:
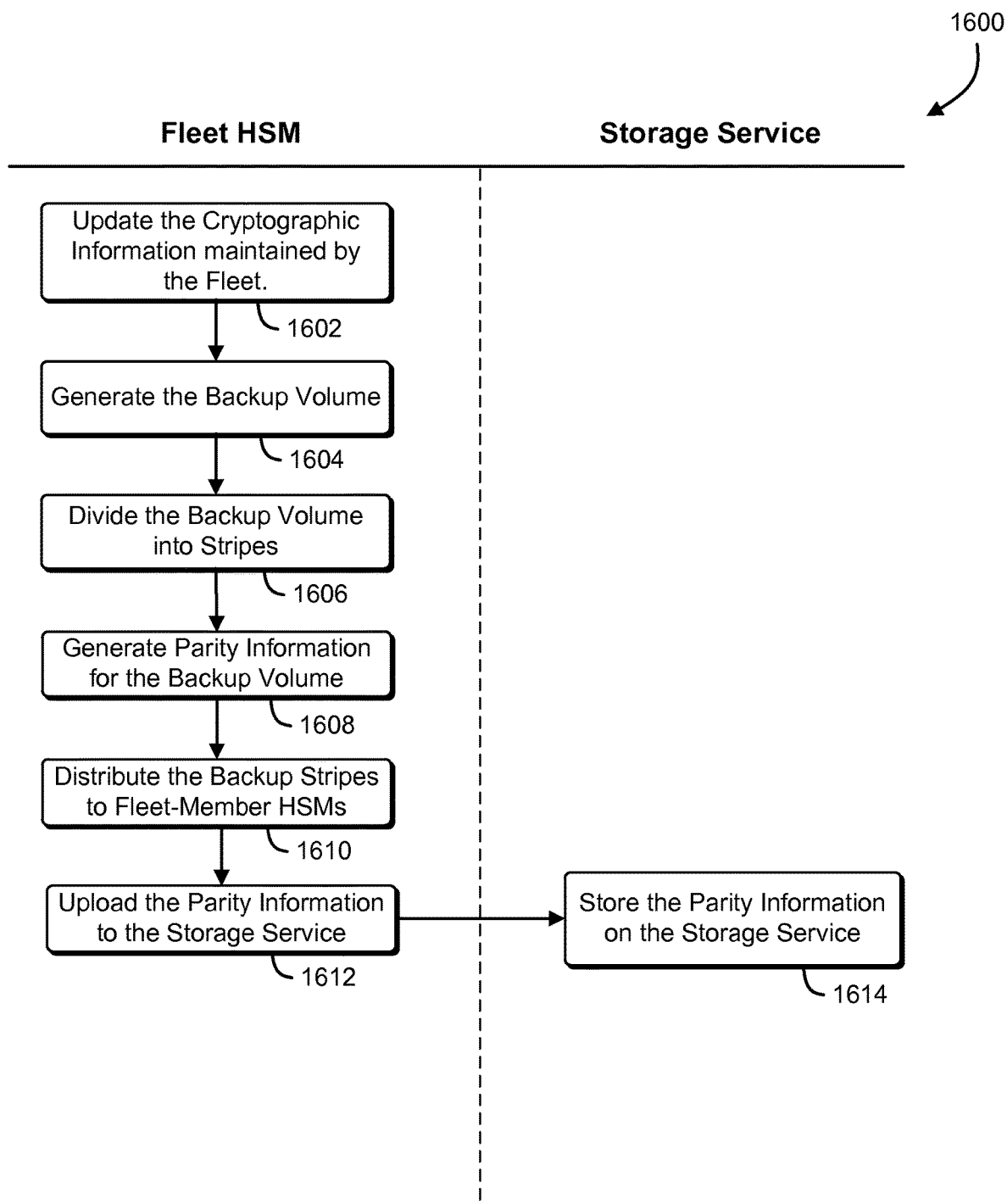
FIG. 16 shows an illustrative example of a process that, as a result of being performed by an HSM fleet and a storage service, backs up information stored on the HSM fleet by exporting parity information to a storage service, in accordance with an embodiment.

FIG. 16 shows an illustrative example of a process that, as a result of being performed by an HSM fleet and a storage service, backs up information stored on the HSM fleet by exporting parity information to the storage service, in accordance with an embodiment. A swim diagram 1600 shows a process that begins at block 1602 with a particular HSM within an HSM fleet updating cryptographic information maintained by the particular HSM. As a result of the cryptographic information being updated, the particular HSM generates 1604 a volume of backup information that represents the cryptographic information maintained by the particular HSM. The backup information may be encoded with the fleet key, an HSM manufacturer's key, or designated backup key to secure the backup information. At block 1606, the particular HSM divides the backup volume into a number of stripes. The particular HSM generates 1608 parity information that can be used to regenerate one or more slices in the event that a particular stripe is lost or corrupted. In one implementation, the backup volume is divided into a number of stripes of equal size, and parity information is a set of exclusive or parity bits for the backup stripes. At block 1610, the particular HSM distributes the backup stripes to fleet-member HSMs so that each HSM in the HSM fleet maintains a different stripe. The parity information is uploaded 1612 to a storage service. The parity information may be encrypted using the fleet key, a backup key, or other encryption key. At block 1614, the storage service receives the parity information from the particular HSM and stores the parity information.

Figure 17:
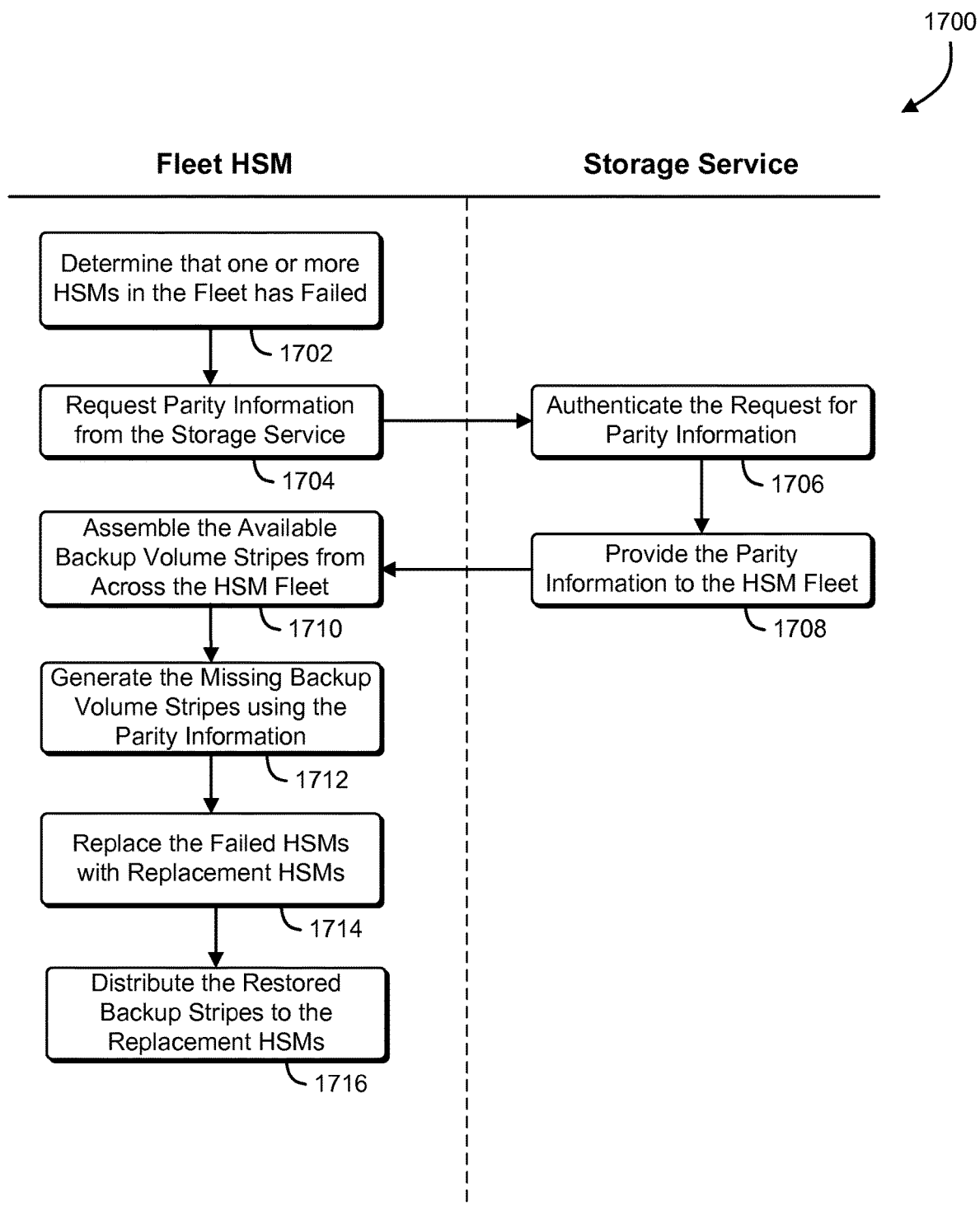
FIG. 17 shows an illustrative example of a process that, as a result of being performed by an HSM fleet and a storage service, restores a failed HSM using parity information retained by the storage service, in accordance with an embodiment.

FIG. 17 shows an illustrative example of a process that, as a result of being performed by an HSM fleet and a storage service, restores a failed HSM using parity information retained by the storage service, in accordance with an embodiment. A swim diagram 1700 illustrates a process that begins at block 1702 with a designated HSM determining that one or more HSMs in HSM fleet has failed. In order to recover from the HSM failure, the designated HSM requests 1704 parity information from the storage service.

The storage service receives the request for parity information from the designated HSM. At block 1706, the storage service authenticates the request by confirming that the requesting HSM is a member of the HSM fleet, and that the requesting HSM is authorized to receive the parity information. At block 1708, the storage service provides the parity information to the designated HSM.

The designated HSM receives 1710 the parity information from the storage service and assembles the remaining backup volume stripes from the remaining HSMs of the HSM fleet. At block 1712, the designated HSM generates the missing backup stripe or stripes using the parity information and the surviving backup volume stripes. In some implementations, the parity information provided by the storage service allows for the recovery of a single backup stripe. In other implementations, the parity information provided by the storage service allows for the recovery of multiple backup stripes by increasing the amount of parity information stored on the storage service. At block 1714, the failed HSM is replaced with a replacement HSM, and the replacement HSM is integrated into the HSM fleet. As part of integrating the replacement HSM, the replacement HSM is provided with a fleet key, backup key, or other cryptographic key necessary to decrypt the backup information. At block 1716, the designated HSM distributes the restored backup information to the replacement HSM. The replacement HSM decrypts the backup information if necessary, and installs the cryptographic information contained in the backup information onto the replacement HSM.

Figure 18:
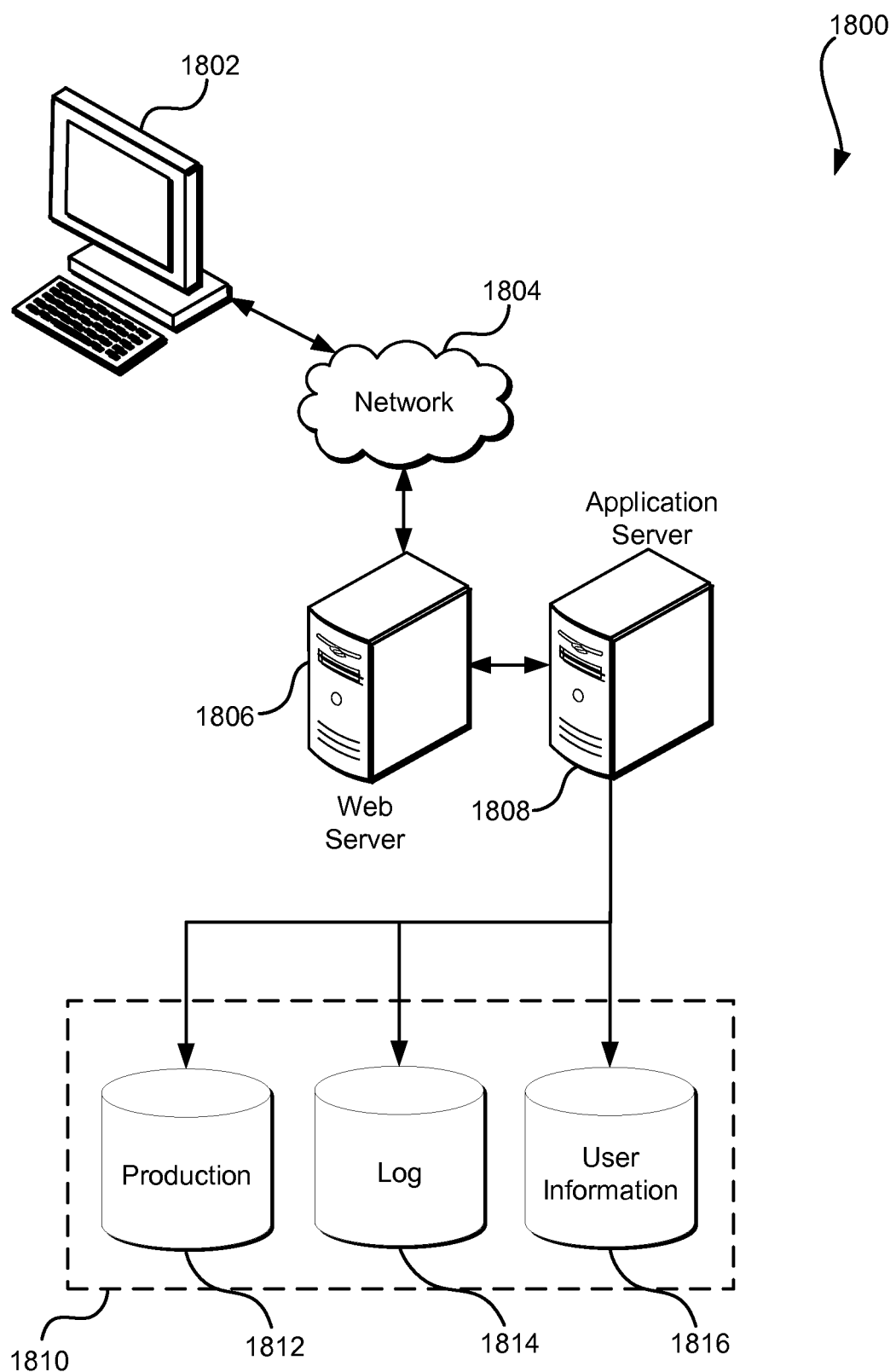
FIG. 18 illustrates an environment in which various embodiments can be implemented.

FIG. 18 illustrates aspects of an example environment 1800 for implementing aspects in accordance with various embodiments. As will be appreciated, although a web-based environment is used for purposes of explanation, different environments may be used, as appropriate, to implement various embodiments. The environment includes an electronic client device 1802, which can include any appropriate device operable to send and/or receive requests, messages, or information over an appropriate network 1804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part on the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1802 and the application server 1808, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1810 can include several separate data tables, databases, data documents, dynamic data storage schemes and/or other data storage mechanisms and media for storing data relating to a particular aspect of the present disclosure. For example, the data store illustrated may include mechanisms for storing production data 1812 and user information 1816, which can be used to serve content for the production side. The data store also is shown to include a mechanism for storing log data 1814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. The application server 1808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake. Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described in this document may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
one or more processors; and
a memory storing executable instructions that, as a result of being executed by the one or more processors, cause the system to:
distribute a cryptographic key across a fleet of tamper-resistant data storage devices by at least:
determining a plurality of stripes of the cryptographic key;
generating parity information for a pair of stripes of the plurality of stripes of the cryptographic key, where the parity information provides data redundancy if a stripe of the pair of stripes is lost or corrupted;
encrypting the plurality of stripes with a fleet key to generate a plurality of encrypted stripes, where the fleet key is stored at a tamper-resistant data storage device of the fleet of tamper-resistant data storage devices and the fleet key being unusable for cryptographic operations outside the tamper-resistant data storage device;
distributing the plurality of encrypted stripes across the fleet of tamper-resistant data storage devices; and
transmitting the parity information to a storage service outside the fleet of tamper-resistant data storage devices.

2. The system of claim 1, wherein the parity information is used to reconstruct the cryptographic key as a result of a plurality of stripes being lost.

3. The system of claim 1, wherein:
the cryptographic key is encrypted with the fleet key prior to generating the plurality of stripes; and
the fleet key is accessible to the fleet of tamper-resistant data storage devices.

4. The system of claim 1, wherein the memory further includes instructions that, as a result of being executed by the one or more processors, cause the system to record a location of the pair of stripes of the plurality of stripes in a hardware security module management hub.

5. The system of claim 1, wherein the parity information is transmitted to a second tamper-resistant data storage device within the fleet of tamper-resistant data storage devices.

6. The system of claim 1, wherein the memory further includes instructions that, as a result of being executed by the one or more processors, cause the system to:
detect a missing stripe of the plurality of stripes;
provide a request for retrieval of the parity information from the storage service;
retrieve a set of remaining stripes of the plurality of stripes from the fleet of tamper-resistant data storage devices; and
regenerate the missing stripe from the plurality of stripes and the parity information.

7. The system of claim 6, wherein the memory further includes instructions that, as a result of being executed by the one or more processors, cause the system to authenticate the request for the parity information by providing a digital signature based at least in part on a fleet key.

8. The system of claim 1, wherein the memory further includes instructions that, as a result of being executed by the one or more processors, cause the system to:
provide a replacement tamper-resistant data storage device with a copy of the fleet key; and
provide the replacement tamper-resistant data storage device with the cryptographic key.

9. A non-transitory computer-readable storage medium storing thereon executable instructions that, as a result of being executed by one or more processors of a computer system that distributes a set of cryptographic keys to a fleet of tamper-resistant data storage devices, cause the computer system to:
determine a plurality of stripes of a cryptographic key of the set of cryptographic keys;
generate parity information for a subset of stripes of the plurality of stripes, where the parity information provides data redundancy if a stripe of the plurality of stripes is corrupted;
encrypt the plurality of stripes using a first copy of a fleet key to generate a plurality of encrypted stripes, with respective copies of the fleet key being available to the fleet of tamper-resistant data storage devices and used within the fleet of tamper-resistant data storage devices without being exposed in an unencrypted form outside of the fleet of tamper-resistant data storage devices;
distribute the plurality of encrypted stripes to members of the fleet of tamper-resistant data storage devices; and
transmit the parity information to a storage service outside the fleet of tamper-resistant data storage devices.

10. The non-transitory computer-readable storage medium of claim 9, wherein the parity information allows for reconstruction of the cryptographic key as a result of a subset of stripes of the plurality of stripes being lost.

11. The non-transitory computer-readable storage medium of claim 9, wherein:
the cryptographic key is encrypted with the fleet key prior to generating the plurality of stripes; and
the fleet key is usable by a tamper-resistant data storage device in the fleet of tamper-resistant data storage devices.

12. The non-transitory computer-readable storage medium of claim 9, wherein the executable instructions further comprise instructions that, as a result of being executed by the one or more processors, cause the computer system to record a location of the pair of stripes of the plurality of stripes in a hardware security module management hub.

13. The non-transitory computer-readable storage medium of claim 9, wherein the parity information is transmitted to a second tamper-resistant data storage device within the fleet of tamper-resistant data storage devices.

14. The non-transitory computer-readable storage medium of claim 9, wherein the executable instructions further comprise instructions that, as a result of being executed by the one or more processors, cause the computer system to:
detect a missing stripe of the plurality of stripes;
provide a request for retrieval of the parity information from the storage service;
retrieve a set of remaining stripes of the plurality of stripes from the fleet of tamper-resistant data storage devices; and
regenerate the missing stripe from the plurality of stripes based at least in part on the parity information.

15. The non-transitory computer-readable storage medium of claim 14, wherein the executable instructions further comprise instructions that, as a result of being executed by the one or more processors, cause the computer system to authenticate the request by at least providing a digital signature based at least in part on the fleet key.

16. The non-transitory computer-readable storage medium of claim 9, wherein the executable instructions further comprise instructions that, as a result of being executed by the one or more processors, cause the computer system to:
provide a replacement tamper-resistant data storage device with a copy of the fleet key; and
provide the replacement tamper-resistant data storage device with the one or more cryptographic keys.

17. A computer-implemented method comprising:
determining a plurality of stripes of a cryptographic key;
generating parity information for the plurality of stripes;
encrypting the plurality of stripes of the cryptographic key and the parity information with a first copy of a fleet key to generate a plurality of encrypted stripes and encrypted parity information;
distributing the plurality of encrypted stripes and encrypted parity information to a tamper-resistant data storage device of a fleet of tamper-resistant data storage devices, with a respective copy of the fleet key stored at the tamper-resistant data storage device and decrypted by a private key associated with the tamper-resistant data storage device; and
transmitting the parity information to a storage service outside the fleet of tamper-resistant data storage devices.

18. The computer-implemented method of claim 17, wherein the parity information allows for reconstruction of the cryptographic key as a result of a subset of stripes of the plurality of stripes being lost.

19. The computer-implemented method of claim 17, wherein:
the cryptographic key is encrypted with the fleet key prior to generating the plurality of stripes; and
the fleet key is usable by the tamper-resistant data storage device in the fleet of tamper-resistant data storage devices.

20. The computer-implemented method of claim 17, further comprising:
detecting a missing stripe of the plurality of stripes;
requesting retrieval of the parity information from the storage service;
retrieving a set of remaining stripes of the plurality of stripes from the fleet of tamper-resistant data storage devices; and
regenerating the missing stripe from the plurality of stripes and the parity information.

21. The computer-implemented method of claim 17, further comprising:
providing a replacement tamper-resistant data storage device with a copy of the fleet key; and
providing the replacement tamper-resistant data storage device with the cryptographic key.

* * * * *